(12) United States Patent
Floyd

(10) Patent No.: US 8,847,671 B2
(45) Date of Patent: Sep. 30, 2014

(54) METHODS AND CIRCUITS FOR A LOW INPUT VOLTAGE CHARGE PUMP

(71) Applicant: Aptus Power Semiconductor, Los Altos, CA (US)

(72) Inventor: Brian Harold Floyd, Sunnyvale, CA (US)

(73) Assignee: Aptus Power Semiconductor, Los Altos, CA (US)

( * ) Notice: Subject to any disclaimer, the term of this patent is extended or adjusted under 35 U.S.C. 154(b) by 44 days.

(21) Appl. No.: 13/861,352

(22) Filed: Apr. 11, 2013

(65) Prior Publication Data
US 2013/0234786 A1 Sep. 12, 2013

Related U.S. Application Data

(60) Provisional application No. 61/694,411, filed on Aug. 29, 2012.

(51) Int. Cl.
*G05F 1/10* (2006.01)
*H02M 3/07* (2006.01)
(52) U.S. Cl.
CPC .................................... *H02M 3/073* (2013.01)
USPC ........................................................ 327/536

(58) Field of Classification Search
USPC ......... 327/530, 534–538, 540, 541, 543, 546; 363/59, 60
See application file for complete search history.

(56) References Cited

U.S. PATENT DOCUMENTS

| 5,767,735 A | * | 6/1998 | Javanifard et al. ............ 327/536 |
| 7,002,399 B2 | | 2/2006 | Nuzzarello et al. |
| 7,679,430 B2 | * | 3/2010 | Fort et al. ...................... 327/536 |
| 2005/0146375 A1 | | 7/2005 | Ker et al. |

* cited by examiner

*Primary Examiner* — Lincoln Donovan
*Assistant Examiner* — Sibin Chen
(74) *Attorney, Agent, or Firm* — Venture Pacific Law, PC

(57) ABSTRACT

A charge pump comprises, a plurality of branches each having serially-connected T-circuit cells, wherein each of the branches has a first end for receiving an input voltage and a second end for outputting a charge pump voltage, wherein each of the T-circuit cells comprises a first transistor, a second transistor, and a capacitor, wherein the first transistor and the second transistor of each of the T-circuit cells have a common drain, and wherein the gate of the first transistor of a certain one of the T-circuit cells of a certain branch is connected to a first branch and the gate of the second transistor of the certain one of the T-circuit cells of the certain branch is connected to a second branch.

15 Claims, 42 Drawing Sheets

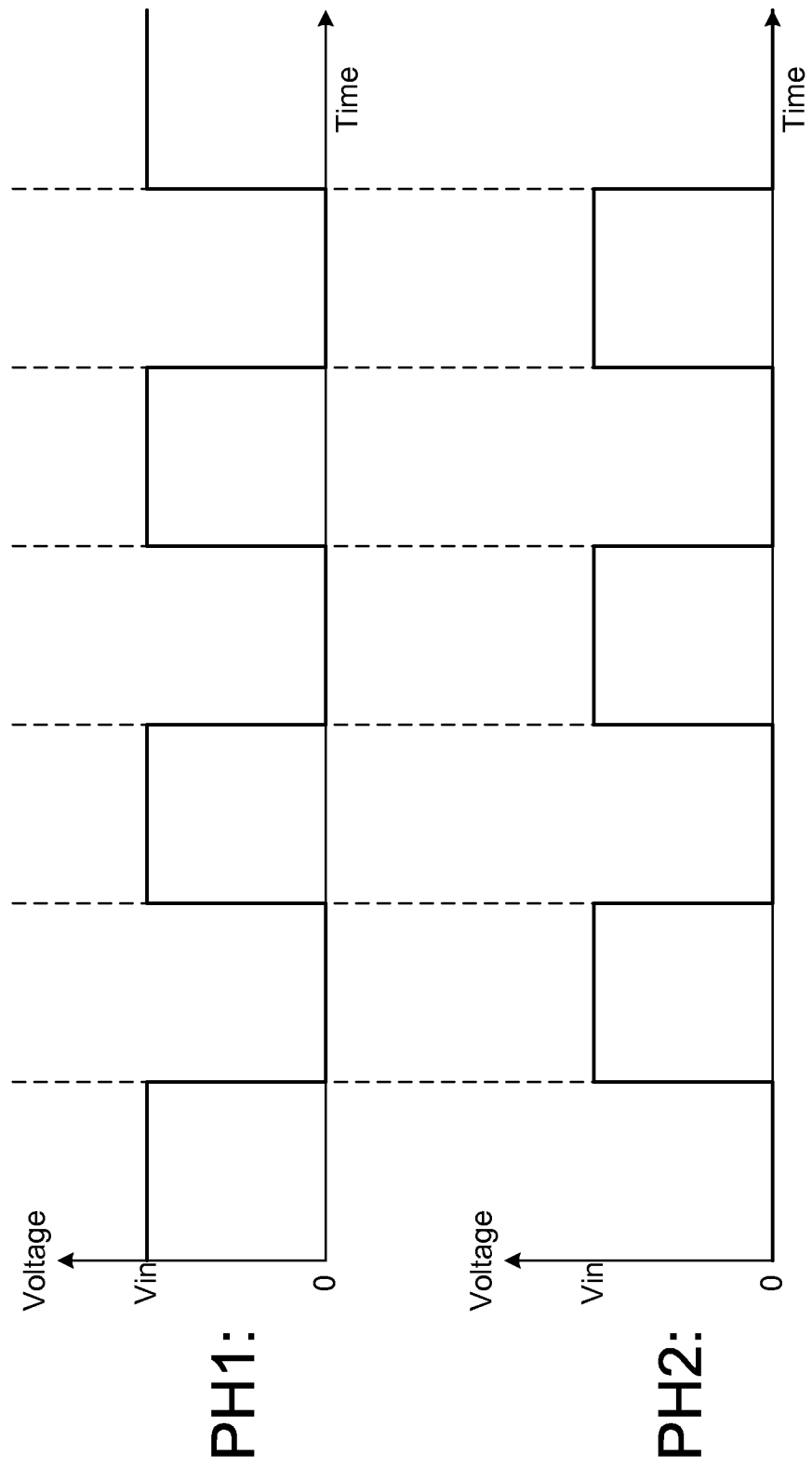

US 8,847,671 B2

METHODS AND CIRCUITS FOR A LOW INPUT VOLTAGE CHARGE PUMP

CROSS REFERENCE

This application claims priority from a provisional patent application entitled "Efficient low-input-voltage charge-pump switch-array circuit topologies" filed on Sep. 1, 2009 and having an Application No. 61/238,884, a nonprovisional patent application entitled "Methods and Circuits for a Low Input Voltage Charge Pump" filed on Aug. 11, 2010 and having an application Ser. No. 12/854,777, and a provisional patent application entitled "Low-Supply-Voltage Charge-Pump Distributed Circuit-Array Topologies and Design Algorithms" filed on Aug. 29, 2012 and having an Application No. 61/694,411. Said applications are incorporated herein by reference.

FIELD OF INVENTION

This invention relates to methods and circuits for a charge pump and, in particular, to methods and circuits for a low input voltage charge pump having a distributed circuit array topology.

BACKGROUND

Typically, charge pumps use a switching process to provide an output voltage that has a larger magnitude than an input voltage. Charge pumps are used in many contexts, e.g., in integrated circuits, peripheral circuits on flash memory, and other circuits, for generating the needed operating voltages from a lower supply voltage.

A number of charge pump designs, such as conventional Dickson-type charge pumps, are known in the art. FIG. 1 illustrates a typical four-stage Dickson charge pump device. The Dickson charge pump comprises diodes D1-D5 connected in series with coupling capacitors C1-C4, where each capacitor is connected to a node between the diodes D1-D5. The Dickson charge pump circuit also includes an output capacitor Cout. The input clock pulses, a ClkA and a ClkB, are out of phase with respect to each other, where the ClkA is applied to the capacitors C1 and C3, and the ClkB is applied to the capacitors C2 and C4. As can be appreciated by persons of ordinary skill in the art, each clock pulse with drive the output voltage by a multiplier of the input voltage.

If the input voltage for the charge pump is particularly low (e.g., 1V or lower), the charge pump, according to previous designs known in the art, would either fail to provide the requisite driving voltage due to switch conduction loss or alternately require a complex structure. Thus, providing charge pump circuits that would have minimal drain (as small as possible) on the power supply for their operation is of significant importance. The present trend toward ever lower supply voltages for integrated circuits can only increase this importance.

Therefore, it is important to provide new methods and circuits for a charge pump which can operate with input voltages as low as 1V or less.

SUMMARY OF INVENTION

An object of this invention is to provide methods and circuits for a charge pump that is operated by a low input voltage.

Another object of this invention is to provide methods and circuits for a charge pump that reduce switch conduction loss.

Yet another object of this invention is to provide methods and circuits for a charge pump that enhance gate driving using a switch array circuit topology.

Briefly, the present invention discloses a charge pump comprising, a plurality of branches each having serially-connected T-circuit cells, wherein each of the branches has a first end for receiving an input voltage and a second end for outputting a charge pump voltage, wherein each of the T-circuit cells comprises a first transistor, a second transistor, and a capacitor, wherein the first transistor and the second transistor of each of the T-circuit cells have a common drain, and wherein the gate of the first transistor of a certain one of the T-circuit cells of a certain branch is connected to a first branch and the gate of the second transistor of the certain one of the T-circuit cells of the certain branch is connected to a second branch.

An advantage of this invention is that methods and circuits for a charge pump are provided, where the charge pump is operated by a low input voltage.

Another advantage of this invention is that methods and circuits for a charge pump are provided that reduce switch conduction loss.

Yet another object of this invention is that methods and circuits for a charge pump are provided that enhance gate drive using a switch array circuit topology.

DESCRIPTION OF THE DRAWINGS

The foregoing and other objects, aspects, and advantages of the invention can be better understood from the following detailed description of the preferred embodiment of the invention when taken in conjunction with the accompanying drawings in which:

FIG. 4 illustrates clock waveforms for clock signals, labeled PH1 and PH2, of a charge pump of the present invention.

DETAILED DESCRIPTION OF THE PREFERRED EMBODIMENTS

It is to be understood that the following circuit description and the figures are understood by a person having ordinary skill in the art, who designs integrated circuits using commonly practiced techniques, including hierarchical circuit design with schematic-entry tools.

Figure 1:
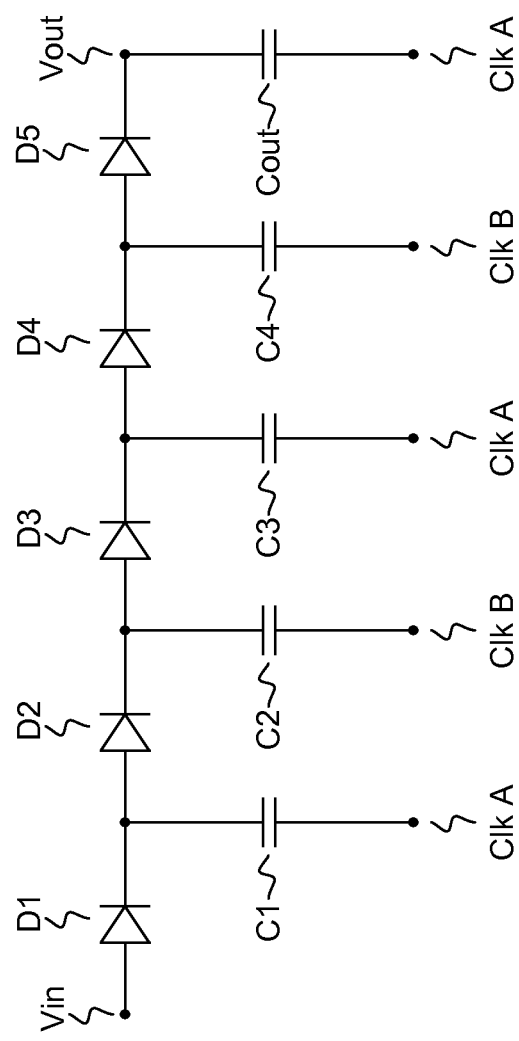
FIG. 1 illustrates a Dickson charge pump of the prior art.
Figure 2A:
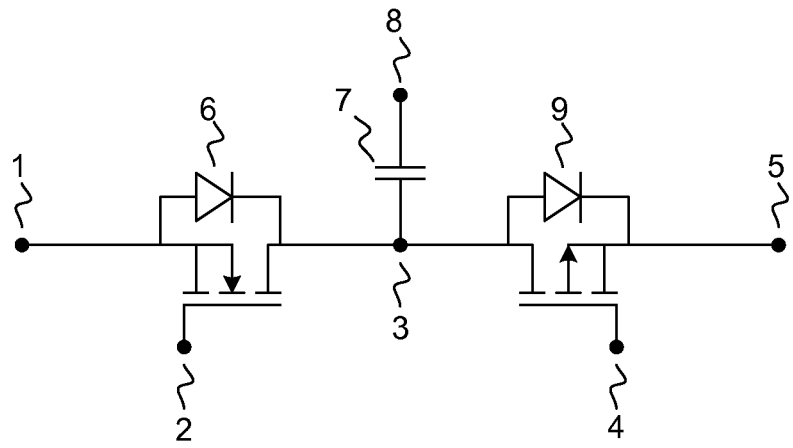
FIG. 2a illustrates a subcircuit of a charge pump of the present invention, where the subcircuit comprises an NMOS transistor, a PMOS transistor, and a pump capacitor C.

FIG. 2a illustrates a subcircuit of a charge pump of the present invention. The subcircuit, herein referred to as subcircuit T, comprises an NMOS transistor 6, a PMOS transistor 9, and a capacitor 7. The source 1 of the NMOS transistor 6 is given port reference NS. It can be understood from the figure that the body of the NMOS transistor 6 is directly connected to its source 1. The gate 2 of the NMOS transistor 6 is given port reference NG. The source 5 of the PMOS transistor 9 is given port reference PS. It is understood from the diagram that the body of the PMOS transistor 9 is directly connected to its source 5. The gate 4 of the PMOS transistor 9 is given port reference PG. The drain of the PMOS transistor 9 and the drain of the NMOS transistor 6 are connected to one port 3 of capacitor 7 at port reference D. The other port 8 of capacitor 7 is connected to a port reference CLK. The ports, as labeled, define a subcircuit T. In alternative embodiments of the invention, the transistors in the subcircuit T can have their respective bodies connected to a fixed global body potential (e.g., a fixed voltage).

Figure 2B:
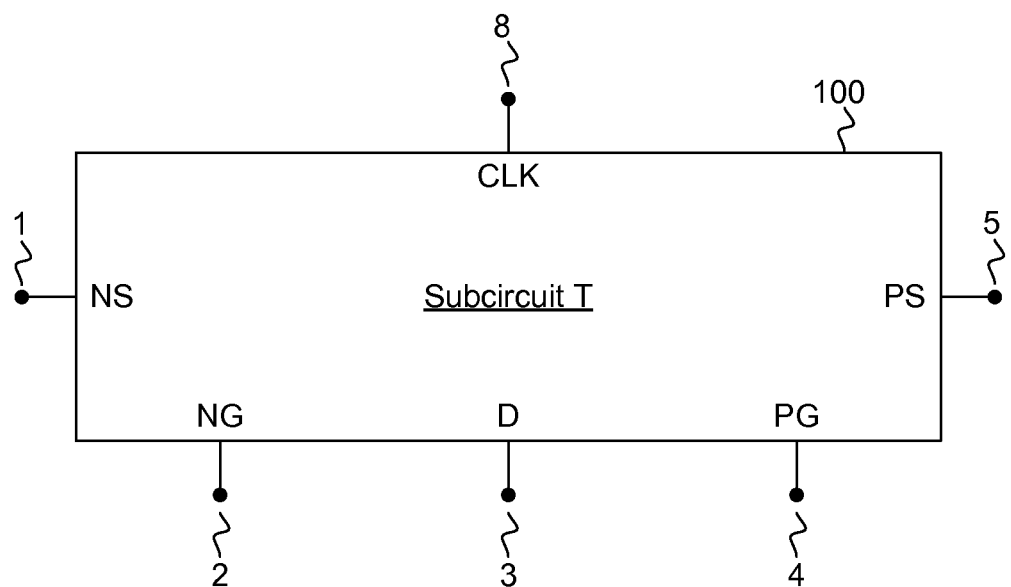
FIG. 2b illustrates a hierarchical block representation of a subcircuit T.

FIG. 2b illustrates a hierarchical block representation of the subcircuit T. The subcircuit T hierarchical block 100 is equivalent to the circuit diagram from FIG. 2a. As defined above, the gate ports are NG at node 2 and PG at node 4. The clock port is CLK at node 8. The source ports are NS at node 1 and PS at node 5. The drain port is D at node 3. Isolation nodes and methodologies are not drawn in the hierarchical block 100 since it is understood by persons having ordinary skill in the art, e.g., those who follow commonly practiced integrated circuit design techniques.

Figure 3A:
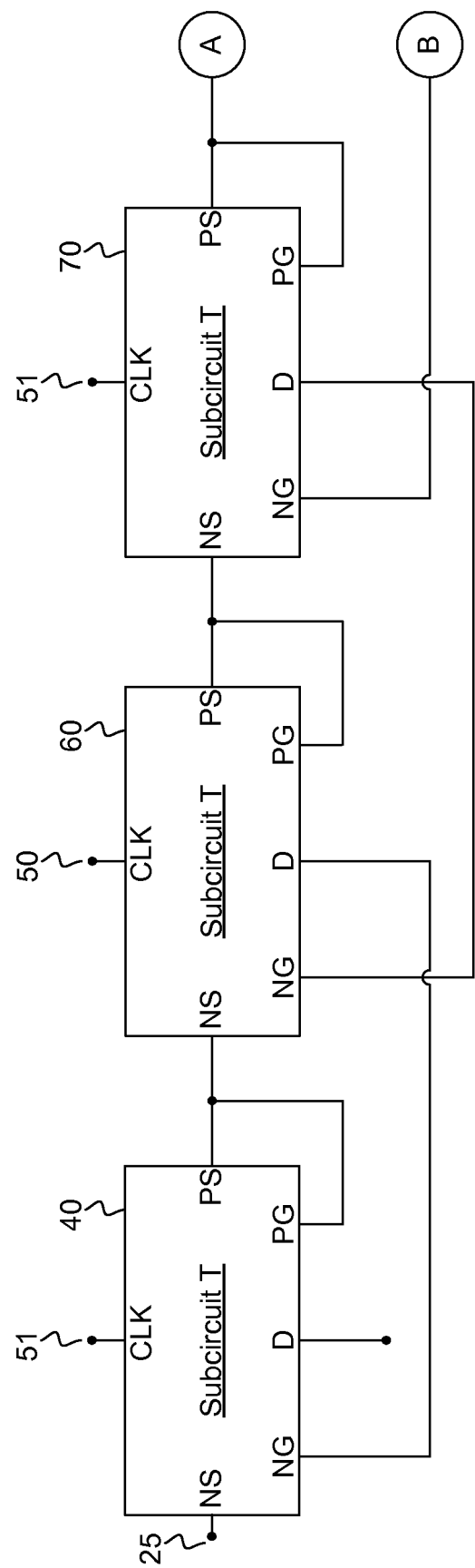
FIGS. 3a-3b illustrate an embodiment of the present invention for a charge pump having a single array of subcircuit T's.
Figure 3B:
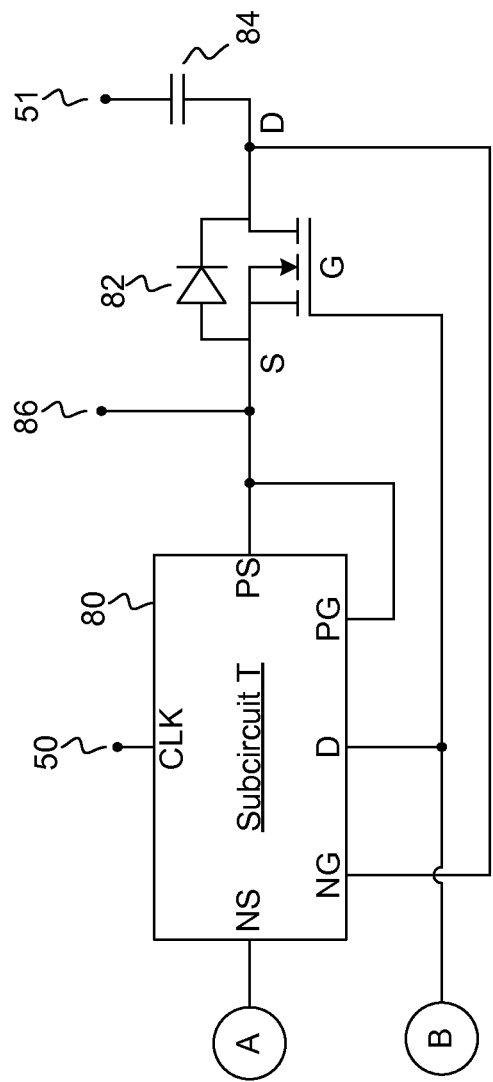

FIGS. 3a-3b illustrate an embodiment of the present invention for a charge pump, where subcircuit T's are cascaded in a single array to create a charge pump. Several stages of the subcircuit T's are illustrated from left to right. The first stage subcircuit T 40 is the left most stage. A voltage VA is at the NS port 25 of subcircuit T 40. The voltage VA can be an output voltage or an input voltage depending upon the type of charge pump operation, i.e., either a negative charge pump or a positive charge pump. The subcircuit T 40's D port remains unconnected, and its CLK port is connected to clock signal 51. The gating port NG of subcircuit T 40 is connected to the D port of a next subcircuit T 60. The gating port PG and port PS of subcircuit T 40 are both connected to the NS port of subcircuit T 60.

The second stage subcircuit T 60 receives clock signal 50 at its CLK port. The gating port NG of subcircuit T 60 is connected to the D port of a next subcircuit T 70. The gating port PG and port PS of subcircuit T 60 are both connected to the NS port of subcircuit T 70. The third stage subcircuit T 70 receives clock signal 51 at its CLK port.

The third stage subcircuit T 70 represents an intermediate stage, and its gating port NG can be connected to a D port of a next subcircuit T stage (illustrated in FIG. 3b). Similarly, subcircuit T 70's PG and PS ports both connect together to the next subcircuit T's NS port. This can be a repeating pattern. Based upon simulation or calculation, the number of stages of subcircuit T's can be selected to meet specific design requirements. A circuit designer can understand from this diagram the repeating pattern and how clock signals 50 and 51 are applied to drive the charge pump. For instance, if clock signal 50 is applied to the first stage, then it must be applied to the first, third, fifth, and so-on in the odd numbered stages of the array. Alternatively, if clock signal 51 is applied to the first even numbered stage, then it must be applied to all the even numbered stages of the array.

FIG. 3b illustrates a method to complete the cascade of subcircuit T's. The previous ports NG, PG, and PS, from subcircuit T 70 in FIG. 3a can be connected to subcircuit T 80 in FIG. 3b. The previous NG port of subcircuit T 70 connects to the D port of subcircuit T 80. The previous PG and PS ports of subcircuit 70 connect to the NS port of subcircuit T 80. Subcircuit T 80 receives clock signal 50 at its CLK port since the previous stage receives clock signal 51. In this illustration, this fourth stage is the right-most or last stage of the cascade. An NMOS transistor 82 must also be connected to complete the charge pump. The PG and PS ports of subcircuit T 80 both connect to the source of the NMOS transistor 82.

It is understood that the source of the NMOS transistor 82 is also connected to its body. Alternatively, the transistors in the charge pump can have their respective bodies connected to a fixed global body potential (e.g., a fixed voltage). It should also be understood that isolation nodes or isolation techniques are not drawn but should be obvious to a person having average skill in the integrated-circuit design field. The drain of the NMOS transistor 82 is connected both to the NG port of subcircuit T 80 and to one port of capacitor 84. The gate of the NMOS transistor 82 is connected to the D port of subcircuit T 80. The other port of capacitor 84 is connected to the opposite-phased clock 51 with the understanding that subcircuit T 80 and capacitor 84 must not receive the same clock signal. In other words, the capacitor 84 can receive clock signal 51 if the subcircuit T receives clock signal 50 at its CLK port, and vice versa.

The voltage VB at node 86 can be an output voltage or an input voltage depending upon the type of charge pump operation, i.e., a negative charge pump or a positive charge pump. Node 86 having the voltage VB is the illustrated connection at port PS of subcircuit T 80.

FIG. 4 illustrates clock waveforms for clock signals 50 and 51, labeled PH1 and PH2, of a charge pump of the present invention. The signal PH1 can correspond to clock signal 50 and the signal PH2 can correspond to clock signal 51. The clock signals can be periodic square-wave signals, which are in practice designed to be non-overlapping clock square waves of amplitude value, Vin. These clock signals connect to the pump capacitors as explained in the prior descriptions and as can be further demonstrated in the following descriptions.

Figure 5A:
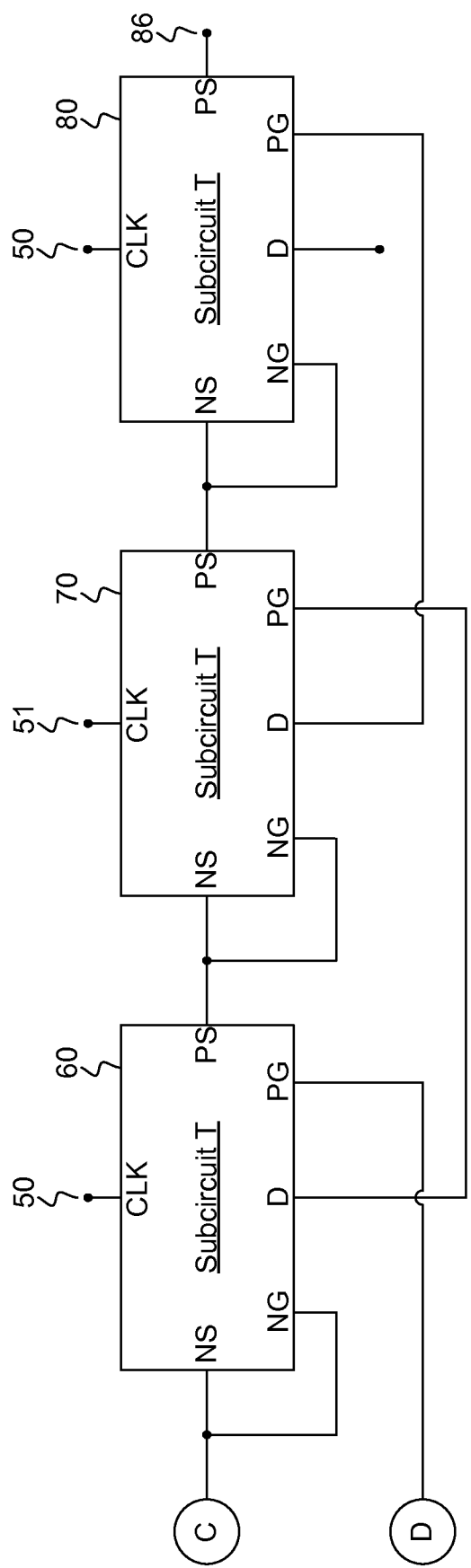
FIGS. 5a-5b illustrate another embodiment of the present invention for a charge pump having a single array of subcircuit T's.
Figure 5B:
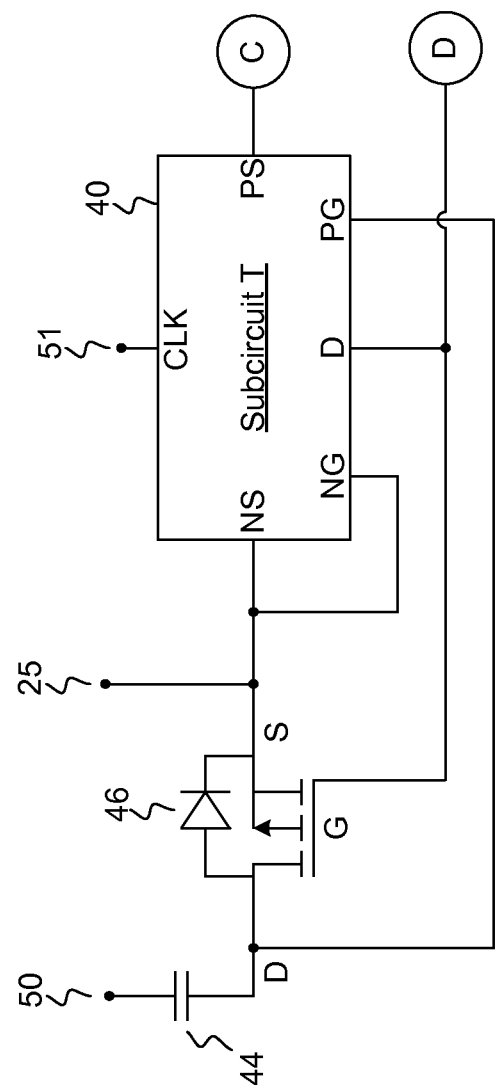

FIGS. 5a-5b illustrate another embodiment of the present invention for a charge pump having a single array of subcircuit T's. Several stages of the subcircuit T's are illustrated from left to right. The stage subcircuit T 80 is the right-most stage. A voltage VB at node 86 is connected at the PS port of subcircuit T 80. The voltage VB at node 86 can be an output or an input voltage depending upon the type of charge pump operation, i.e., a negative charge pump or a positive charge pump. The D port of the subcircuit T 80 remains unconnected. The CLK port of the subcircuit T 80 is connected to clock signal 50. The gating port PG of subcircuit T 80 is connected to the D port of a preceding subcircuit T 70. The gating port NG and port NS of subcircuit T 80 are both connected to the PS port of subcircuit T 70.

The middle stage subcircuit T 70 receives clock signal 51 at its CLK port. The gating port PG of subcircuit T 70 is connected to the D port of a preceding subcircuit T 60. The gating port NG and port NS of subcircuit T 70 are both connected to the PS port of subcircuit T 60. The subcircuit T 60 receives clock signal PHI 50 at its CLK port. The subcircuit T 60 represents an intermediate stage, and its gating port PG can connect to a D port of a preceding subcircuit T 40 stage. Similarly NG and NS ports of the subcircuit T 60 both connect together to the PS node of the preceding subcircuit T 40.

The connections of the array of subcircuit T's repeat in the designed pattern. Based upon simulation, calculation or other criterion, the number of stages of subcircuit T's can be selected to meet specific design requirements. A person having ordinary skill in circuit design can appreciate from this diagram the designed pattern and how clock signals 50 and 51 are applied. For instance, if clock signal 50 is applied to the first stage, then it must be applied to the first, third, fifth, and so-on odd stages in the array. Alternatively, if clock signal 51 is applied to the first even stage, then it must be applied to all even stages in the array.

FIG. 5b illustrates a method to complete the cascade of subcircuit T's in FIG. 5a. The previous ports PG, G, and NS from subcircuit T 60 of FIG. 5a can be connected to subcircuit T 40 in FIG. 5b. The PG port of subcircuit T 60 connects to the D port of subcircuit T 40. The NG and NS ports of subcircuit T 60 are both connected to the PS port of subcircuit T 40. The subcircuit T 40 receives clock signal 51 at its CLK port. This stage is the left-most or first stage of the cascade and a PMOS transistor 46 can also be connected to complete the charge pump. The NG and NS ports of subcircuit T 40 both connect to the source of the PMOS transistor 46.

It is understood that the source of the PMOS transistor 46 is also connected to its body. Alternatively, the transistors in the charge pump can have their respective bodies connected to a fixed global body potential (e.g., a fixed voltage). It should also be understood that isolation nodes or isolation techniques are not drawn, but should be obvious to a person having average skill in the integrated-circuit design field. The drain of the PMOS transistor 46 is connected to both the PG port of subcircuit T 40 and to one port of capacitor 44. The gate of the PMOS transistor 46 is connected to the D port of subcircuit T 40. The other port of capacitor 44 is connected to the opposite-phased clock 50 with the understanding that subcircuit T 40 and the capacitor 44 do not receive the same clock signal. In other words, the capacitor 44 receives clock signal 50 if subcircuit T 40 receives clock signal 51 at its respective CLK port; and vice versa.

The voltage VA at node 25 can be an output or an input voltage depending upon the type of charge pump operation, i.e., negative or positive charge pump. Node 25 having the voltage VA is the illustrated connection at port NS of subcircuit T 40.

Figure 6:
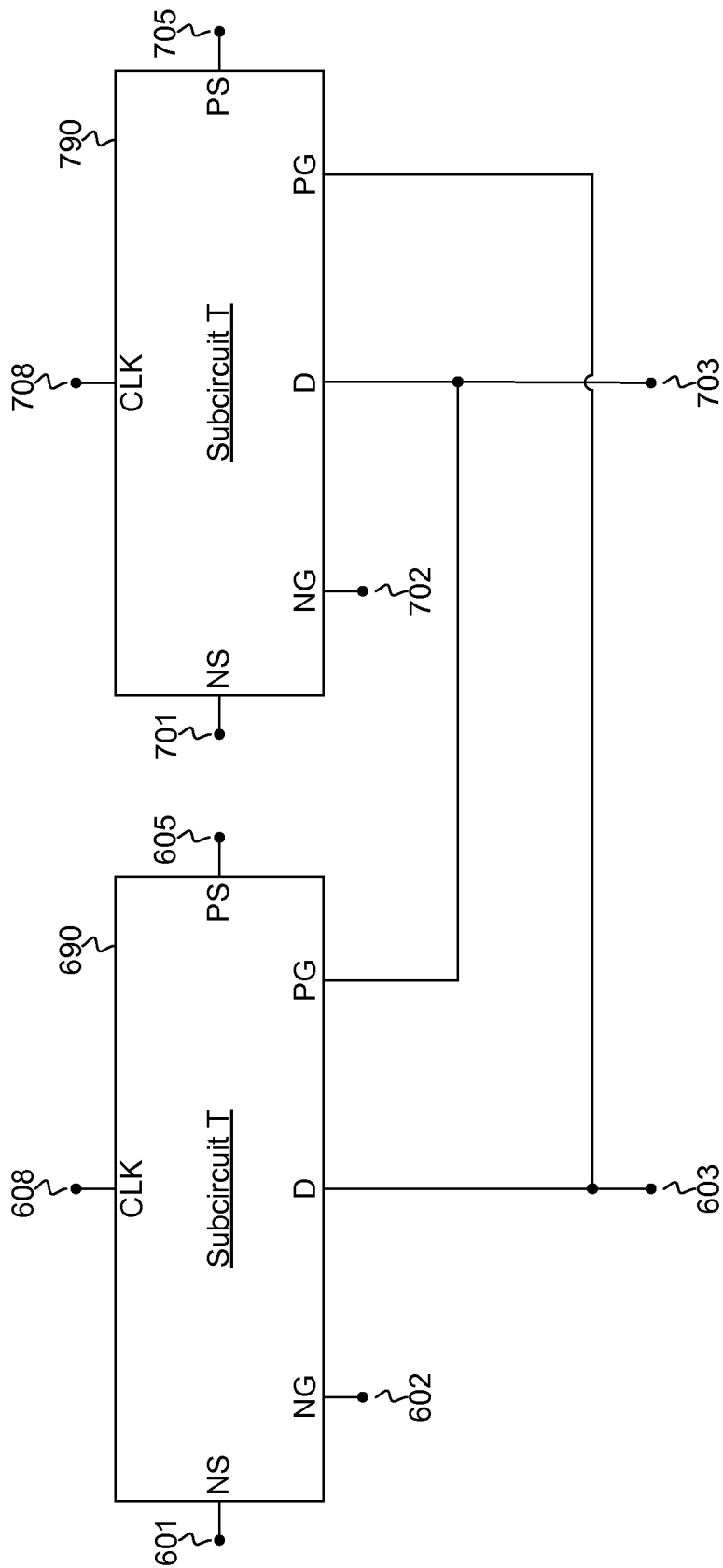
FIG. 6 illustrates an interconnection of two subcircuit T's to form a block circuit, herein referred to as subcircuit P.

FIG. 6 illustrates an interconnection of two subcircuit T's to form a block circuit, herein referred to as subcircuit P. The ports of subcircuit T 690 are referenced as follows: the NS port is given port reference NS1 at node 601; the NG port is given port reference NG1 at node 602; the D port is given port reference D1 at node 603; the PS port is given port reference PS1 at node 605; and the CLK port is given port reference CLKA at node 608. The ports of subcircuit T 790 are referenced as follows: the NS port is given port reference NS2 at node 701; the NG port is given port reference NG2 at node 702; the D port is given port reference D2 at node 703; the PS port is given port reference PS2 at node 705; and the CLK port is given port reference CLKB at node 708. The PG port of subcircuit T 690 connects directly to the D2 port of subcircuit T 790. Similarly, the PG port of subcircuit T 790 connects directly to the D1 port of subcircuit T 690.

Figure 7:
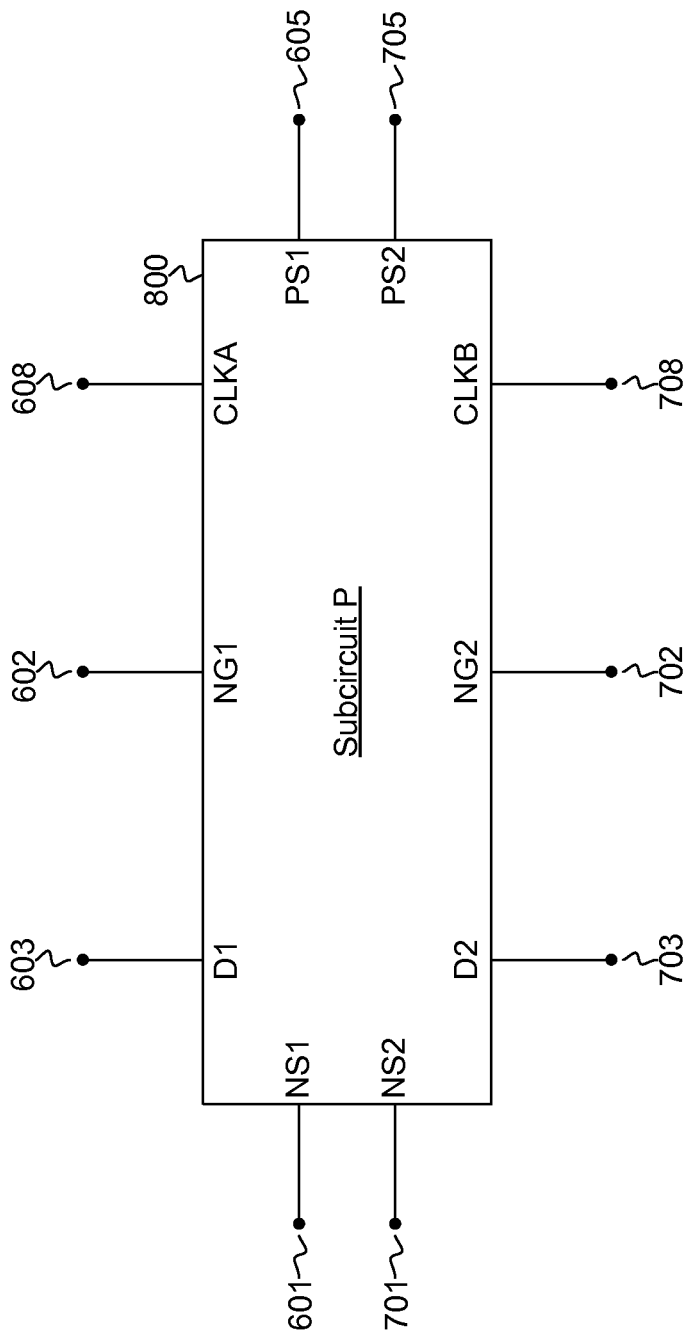
FIG. 7 illustrates a hierarchical block representation of a subcircuit P.

FIG. 7 illustrates a hierarchical block representation of a subcircuit P. The subcircuit P symbol 800 is equivalent to the circuit diagram of FIG. 6. The usage of the hierarchical block should be clear to a person have ordinary skill in circuit design and familiar with drawing a hierarchy of schematics. The ports of subcircuit P 800 correspond to the ports referenced in FIG. 6 and are summarized as follows: the gating ports are NG1 at node 602 and NG2 at node 702; the drain ports are D1 at node 603 and D2 at node 703; the clock-signal ports are CLKA at node 608 and CLKB at node 708; the left NMOS source ports are NS1 at node 601 and NS2 at node 701; and the right PMOS source ports are PS1 at node 605 and PS2 at node 705.

The hierarchical block representation of a subcircuit P can be used in generating hierarchical schematics. It is also understood that additional layout requirements, such as isolation wells with their respective isolation-node connections, are global. Isolation nodes and methodologies are not drawn in this hierarchical block since it is commonly understood by persons have ordinary skill in the art. There is a rule in connecting the CLKA and the CLKB ports: the CLKA and CLKB ports must receive opposite-phased (or out-of-phase) clocks. Thus, if a designer uses clock signals 50 and 51 and the CLKA port receives clock signal 50, then the CLKB port must receive clock signal 51. Alternatively, if the CLKA port receives clock signal 51, then the CLKB port must receive clock signal 50.

Figure 8A:
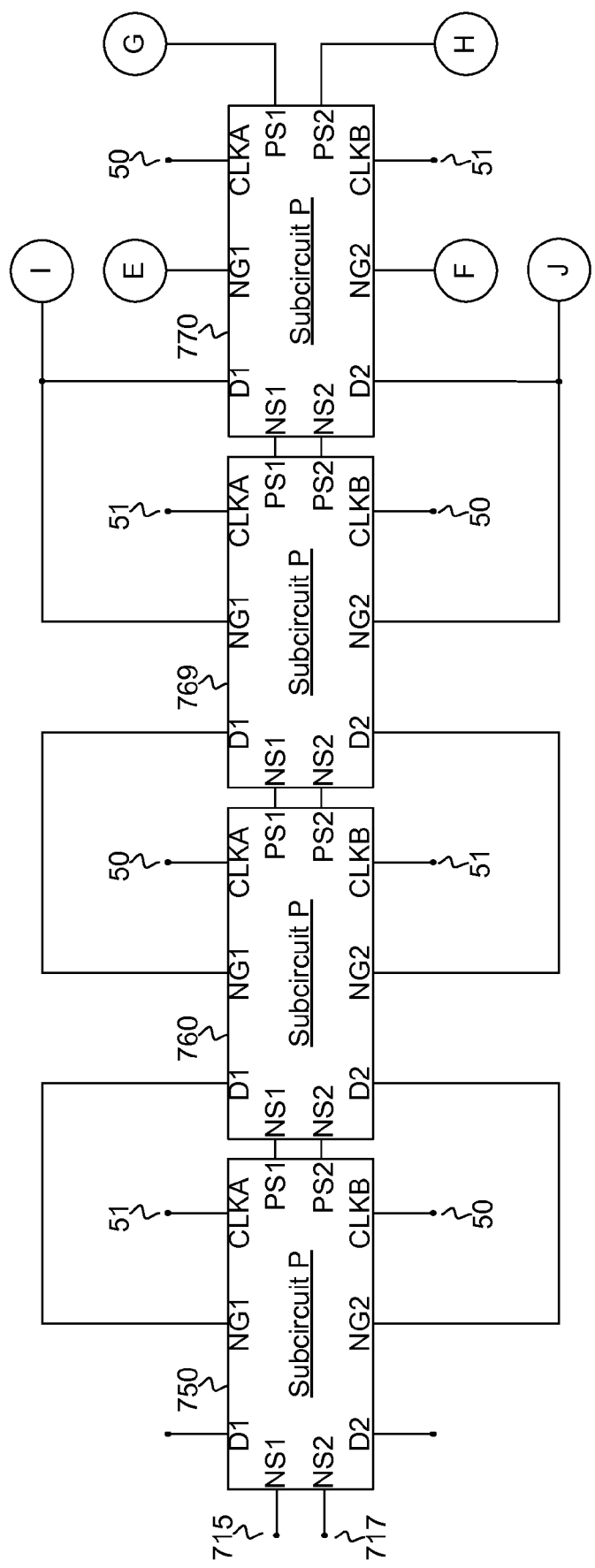
FIGS. 8a-8b illustrate another embodiment of the present invention for a dual array charge pump having multiple subcircuit P's.
Figure 8B:
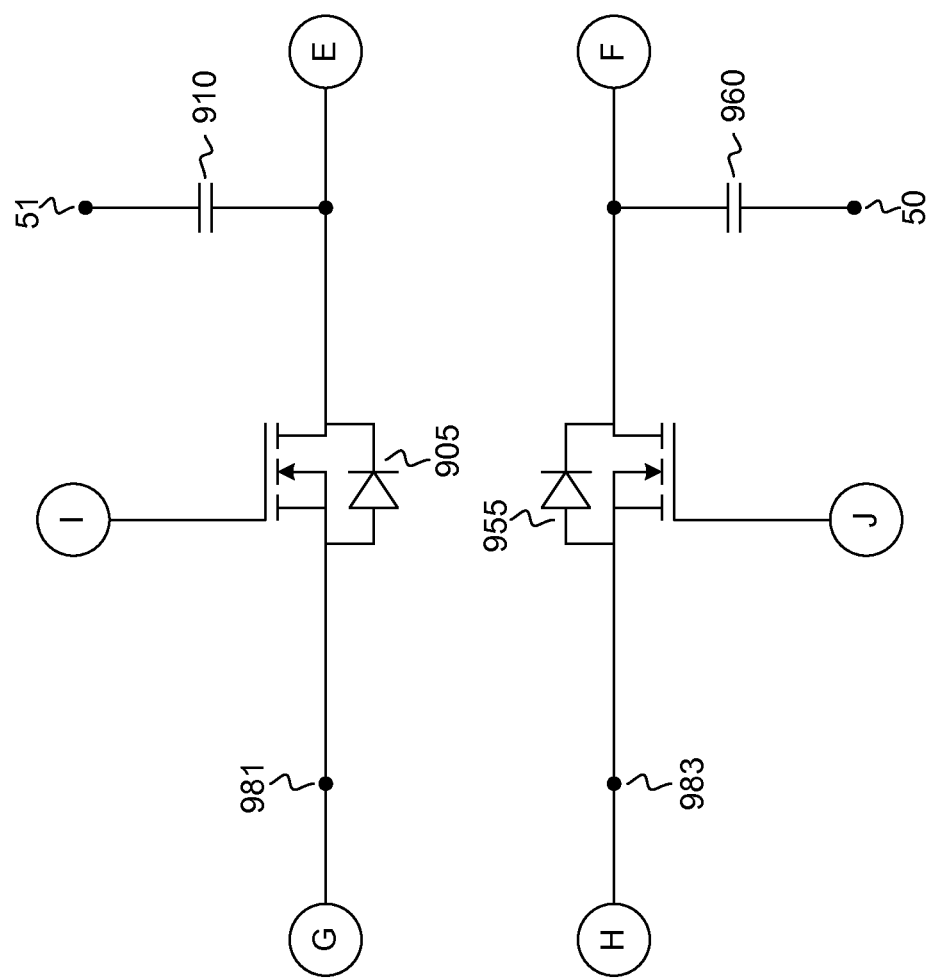

FIGS. 8a-8b illustrate another embodiment of the present invention for a dual array charge pump having an array of subcircuit P's. Various stages of subcircuit P's are placed from left to right. A first stage subcircuit P 750 is the left-most stage. A voltage VA1 is at the NS1 port of the subcircuit P 750 at node 715 and voltage VA2 is at the NS2 port of the subcircuit P 750 at node 717. The VA1 at node 715 and VA2 at node 717 can both be output voltages or input voltages depending upon the type of charge pump operation, i.e., a negative charge pump or positive charge pump.

The D1 and D2 ports of subcircuit P 750 remain unconnected. The CLKA port of subcircuit P 750 is connected to clock signal 51 and the CLKB port of subcircuit P 750 is connected to clock signal 50. The gating port NG1 of subcircuit P 750 is connected to the D1 port of a next subcircuit P 760, while the gating port NG2 of subcircuit P 750 is connected to the D2 port of the next subcircuit P 760. The PS1 port of subcircuit P 750 connects directly to the NS1 port of subcircuit P 760, while the PS2 port of subcircuit P 750 connects directly to the NS2 port of subcircuit P 760. The second stage subcircuit P 760 receives clock signal 50 at its CLKA port and clock signal 51 at its CLKB port.

This pattern is designed such that the gating ports NG1 and NG2 of subcircuit P 760 are connected to the D1 and D2 ports, respectively, of a next subcircuit P 769, while the PS1 and PS2 ports of subcircuit P 760 connect to the NS1 and NS2 ports, respectively, of the next subcircuit P 769.

This is a repeating pattern. Based upon simulation or calculation, the number of stages of subcircuit P can be selected to meet the specific design requirements. A person having ordinary skill in circuit design can appreciate from this diagram the repeating pattern and how clock signals 50 and 51 are applied, such that if one stage of subcircuit P receives clock signal 50 at its respective CLKA port, then the next successive stage of subcircuit P's must receive clock signal 51 at the next successive stage's respective CLKA port.

Thus, the subcircuit P 769 receives clock signal 51 at its CLKA port and clock signal 50 at its CLKB port. The ports NG1, NG2, PS1, and PS2, of subcircuit P 769 are connected to a subcircuit P 770. The NG1 and NG2 ports of subcircuit P 769 can be connected to the D1 and D2 ports, respectively, of subcircuit P 770. The PS1 and PS2 ports of the subcircuit P 769 can be connected directly to the NS1 and NS2 ports, respectively, of subcircuit P 770.

The subcircuit P 770 receives clock signals 50 and 51 at its CLKA and CLKB ports, respectively, according to the repeating requirements described earlier. This stage is the right-most or last stage of the dual-array cascade and two NMOS transistors 905 and 955 are also connected to complete the charge pump. The PS1 node of subcircuit P 770 connects to the source of the NMOS transistor 905. It is understood that the source of the NMOS transistor 905 is also connected to its body. Alternatively, the transistors in the charge pump can have their respective bodies connected to a fixed global body potential (e.g., a fixed voltage). It should also be understood that isolation nodes or isolation techniques are not drawn but should be obvious to a person having ordinary skill in the integrated circuit design field.

The drain of NMOS transistor 905 drain is connected to both the NG1 port of subcircuit P 770 and to one port of capacitor 910. The NMOS transistor 905 gate is connected to the D1 port of subcircuit P 770. The other port of capacitor 910 is connected to the clock 51 with the understanding that the CLKA port of subcircuit P 770 and the capacitor 910 must not receive the same clock signal. The PS2 node of subcircuit P 770 connects to the NMOS transistor 955 source. It is understood that the NMOS transistor 955 source is also connected to its body. Alternatively, the transistors in the charge pump can have their respective bodies connected to a fixed global body potential (e.g., a fixed voltage). It should also be understood that isolation nodes or isolation techniques are not drawn but should be obvious to a person having ordinary skill in the integrated circuit design field.

The drain of the NMOS transistor 955 is connected both to the NG2 port of subcircuit P 770 and to one port of capacitor 960. The gate of the NMOS transistor 955 is connected to the D2 port of subcircuit P 770. The other port of capacitor 960 is connected to clock signal 50 with the understanding that the CLKB port of subcircuit P 770 and the capacitor 960 do not receive the same clock signal.

Voltages VB1 at node 981 and VB2 at node 983 are at the PS1 and PS2 ports of the subcircuit P 770, respectively. The voltages VB1 and VB2 can both be output voltages or both input voltages depending upon the type of charge pump operation, i.e., a negative charge pump or a positive charge pump.

Figure 9:
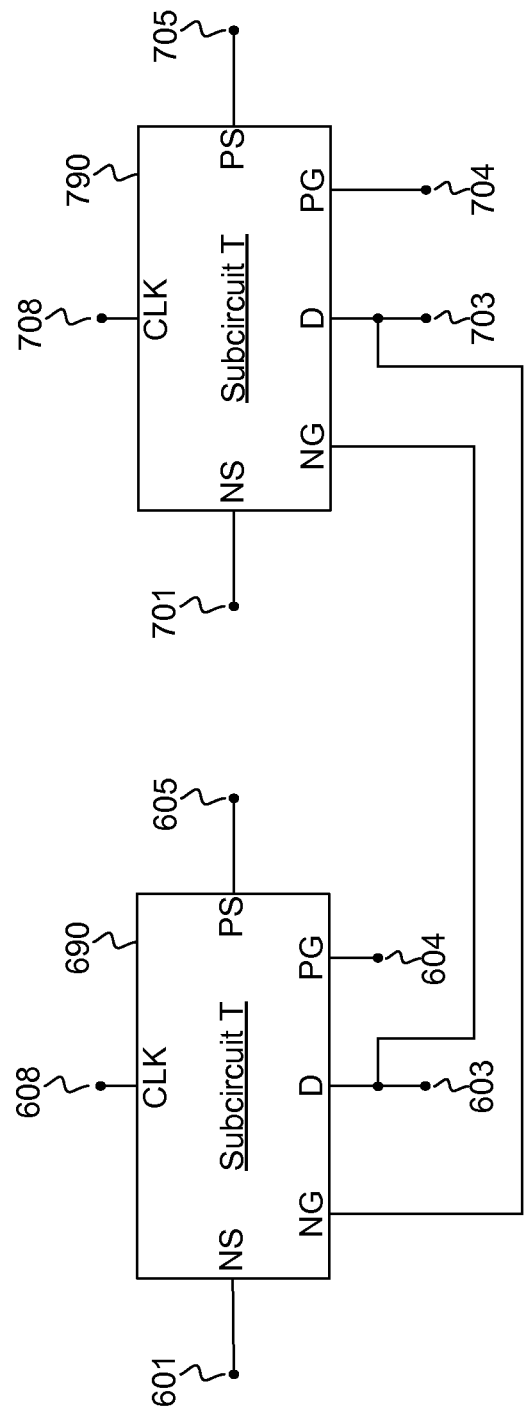
FIG. 9 illustrates an interconnection of two subcircuit T's to form a block circuit, herein referred to as subcircuit N.

FIG. 9 illustrates an interconnection of two subcircuit T's to form a block circuit, herein referred to as subcircuit N. The ports of subcircuit T 690 are referenced as follows: the NS port is given port reference NS1 at node 601; the PG port is given port reference PG1 at node 604; the D port is given port reference D1 at node 603; the PS port is given port reference PS1 at node 605; and the CLK port is given port reference CLKA at node 608.

The ports of subcircuit T 790 are referenced as follows: the NS port is given port reference NS2 at node 701; the PG port is given port reference PG2 at node 704; the D port is given port reference D2 at node 703; the PS port is given port reference PS2 at node 705; and the CLK port is given port reference CLKB at node 708. The NG port of subcircuit T 690 connects directly to the D2 port of subcircuit T 790. Similarly, the NG port of subcircuit T 790 connects directly to the D1 port of subcircuit T 690.

Figure 10:
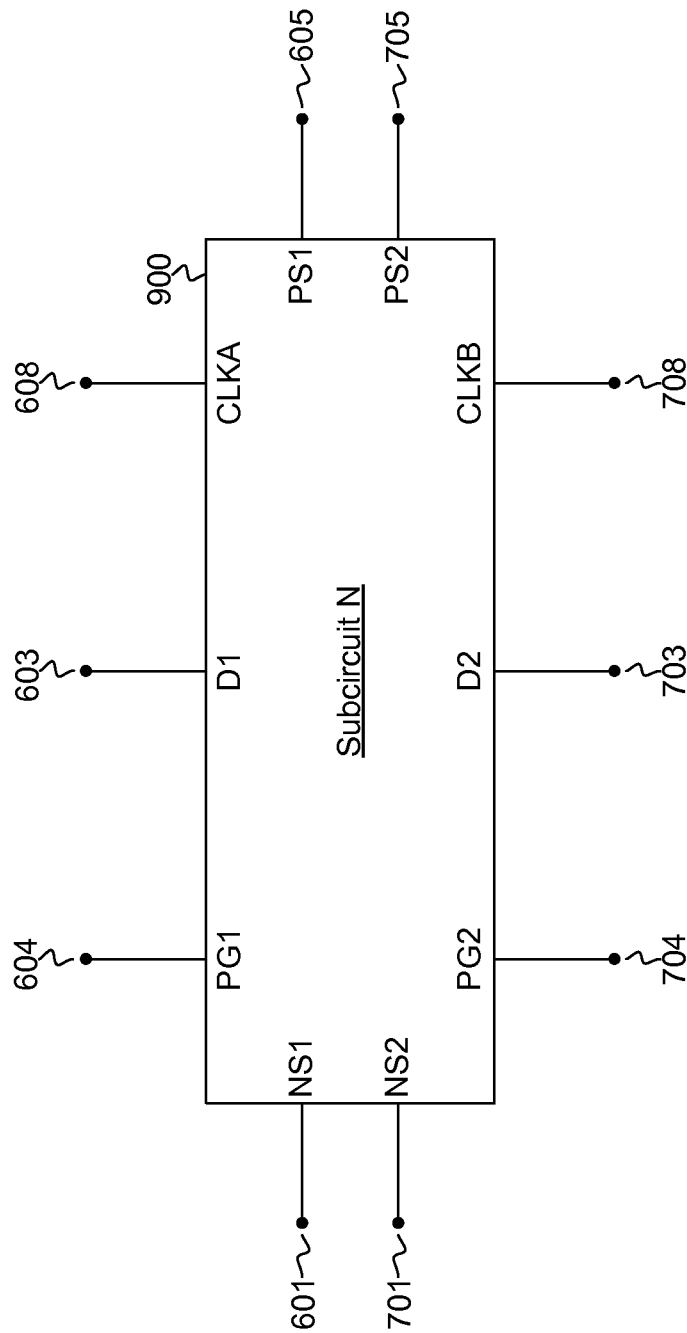
FIG. 10 illustrates a hierarchical block representation of a subcircuit N.

FIG. 10 illustrates a hierarchical block representation of the subcircuit N. The hierarchical block representation of subcircuit N is equivalent to the circuit diagram in FIG. 11. The hierarchical block's usage from the diagram should be clear to a person having ordinary skill in the circuit design field. The ports of subcircuit N 900 correspond to the ports referenced in FIG. 9 and are summarized as follows: the gating ports are PG1 and PG2; the drain ports are D1 and D2; the clock signal ports are CLKA and CLKB; the left NMOS source ports are NS1 and NS2; and the right PMOS source ports are PS1 and PS2. The hierarchical blocks can be used in generating hierarchical schematics. It would be understood that additional layout requirements, such as isolation wells with their respective isolation node connections, are global. Isolation nodes and methodologies are not drawn in the hierarchical block since it is understood by persons having ordinary skill in the art regarding integrated circuit design techniques.

There is a rule in connecting the CLKA and the CLKB ports: the CLKA and CLKB ports must receive opposite-phased (or out-of-phase) clocks. Thus, if clock signals 50 and 51 are used and the CLKA port receives clock signal 50, then the CLKB port must receive clock signal 51. Alternatively, if the CLKA port receives clock signal 51, then the CLKB port must receive clock signal 50.

Figure 11A:
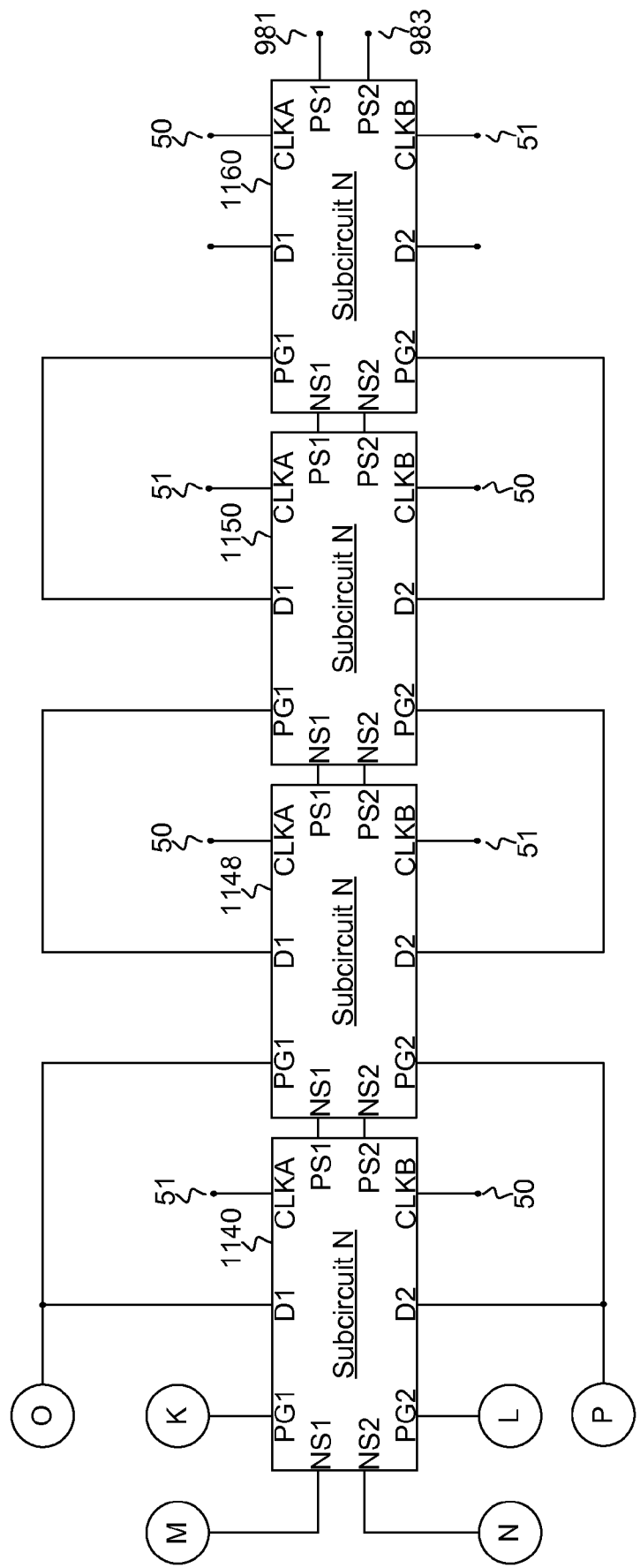
FIGS. 11a-11b illustrate another embodiment of the present invention for a dual array charge pump having multiple subcircuit N's.
Figure 11B:
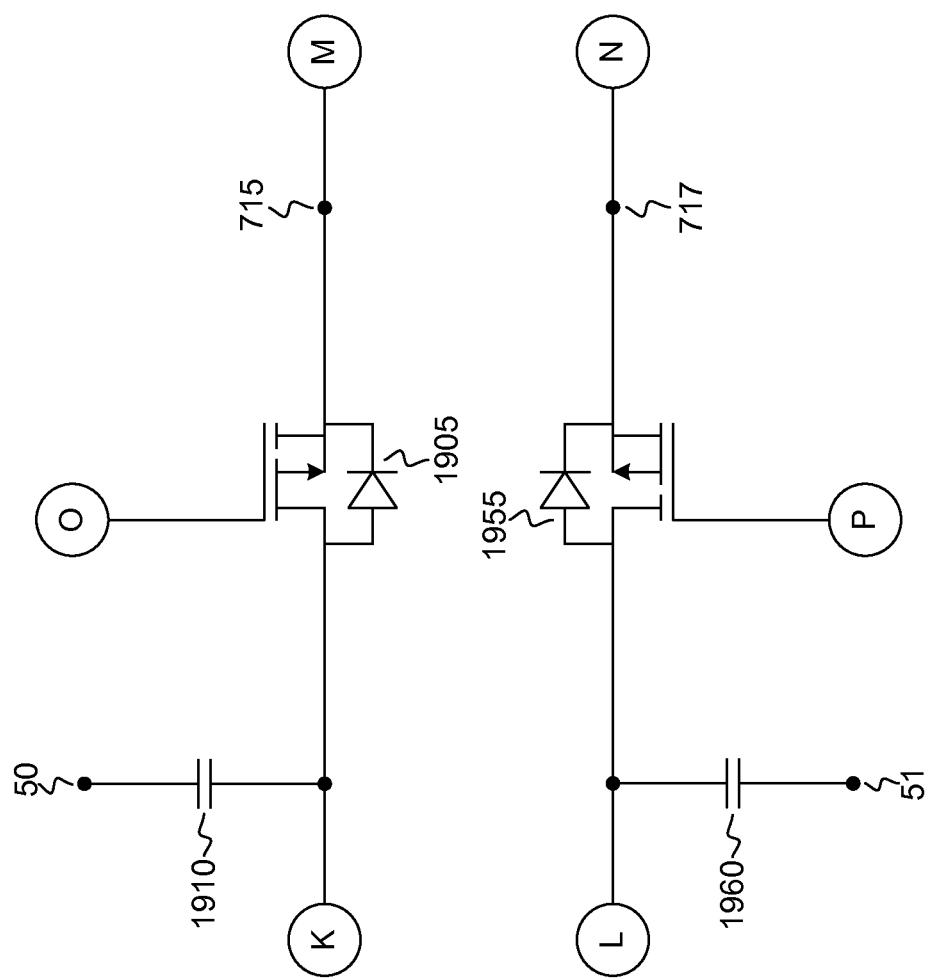

FIGS. 11a-11b illustrate another embodiment of the present invention for a dual array charge pump having a plurality of subcircuit N's. Stages of subcircuit N's are placed from left to right. The subcircuit N 1160 is the right-most stage. A voltage VB1 at node 981 connected to the PS1 port of subcircuit N 1160 and a voltage VB2 at node 983 connected to the PS2 port of subcircuit N 1160. The VB1 and VB2 voltages can both be output voltages or input voltages depending upon the type of charge pump operation, i.e., a negative charge pump or a positive charge pump.

The D1 and D2 ports of the subcircuit 1160 remain unconnected. Its CLKB port is connected to clock signal 51 and its CLKA port is connected to clock signal 50. The gating port PG1 of subcircuit N 1160 is connected to the D1 port of subcircuit N 1150, while the gating port PG2 of subcircuit N 1160 is connected to the D2 port of the subcircuit N 1150. The PS1 port of subcircuit N 1150 connects directly to the NS1 port of subcircuit N 1160, while the PS2 port of subcircuit N 1150 connects directly to the NS2 port of subcircuit N 1160.

The subcircuit N 1150 receives clock signal 50 at its CLKB port and clock signal 51 at its CLKA port. This pattern is repeating such that the gating ports PG1 and PG2 of subcircuit N 1150 are connected to the D1 and D2 ports, respectively, of a subcircuit N 1148, while the NS1 and NS2 ports of subcircuit N 1150 connect to the PS1 and PS2 ports, respectively, of subcircuit N 1148.

Based upon simulation or calculation, the number of stages of subcircuit N's can be set to meet specific design requirements. A person have ordinary skill in the circuit design field can understand the repeating pattern and how clock signals 50 and 51 are applied such that if one stage of subcircuit N receives clock signal 50 at the CLKA port, then the next successive stage of subcircuit N must receive clock signal 51 at the CLKA port. Thus, the subcircuit N 1148 must receive clock signal 51 at the CLKB port and clock signal 50 at the CLKA port.

The ports PG1, PG2, NS1, and NS2, of subcircuit N 1148 can be connected to subcircuit N 1140. The PG1 and PG2 ports of subcircuit N 1148 connect to the D1 and D2 ports, respectively, of subcircuit N 1140. The previous NS1 and NS2 ports connect directly to the PS1 and PS2 ports, respectively, of subcircuit N 1140. The subcircuit N 1140 receives clock signals 50 and 51 at its CLKB and CLKA ports, respectively, by the repeating requirements.

This stage is the left-most or initial stage of the dual array cascade, and two PMOS transistors 1905 and 1955 can also be connected to complete the charge pump. The NS1 node of subcircuit N 1140 connects to the source of the PMOS transistor 1905. It is understood that the source of the PMOS transistor 1905 is also connected to its body. Alternatively, the transistors in the charge pump can have their respective bodies connected to a fixed global body potential (e.g., a fixed voltage). It should also be understood that isolation nodes or isolation techniques are not drawn but is well known to a person having ordinary skill in the art.

The drain of the PMOS transistor 1905 is connected both to the PG1 port of subcircuit N 1140 and to one port of capacitor 1910. The gate of the PMOS transistor 1905 gate is connected to the D1 port of subcircuit N 1140. The other port of capacitor 1910 is connected to the clock 50 with the understanding that the CLKA port of subcircuit N 1140 and the capacitor 1910 must not receive the same clock signal.

The NS2 node of subcircuit N 1140 connects to the source of PMOS transistor 1955. It is understood that the source of PMOS 1955 is also connected to its body. Alternatively, the transistors in the charge pump can have their respective bodies connected to a fixed global body potential (e.g., a fixed voltage). It should also be understood that isolation nodes or isolation techniques are not drawn but is known to a person having ordinary skill in integrated circuit design. The drain of PMOS transistor 1955 is connected both to the PG2 port of subcircuit N 1140 and to one port of capacitor 1960. The gate of PMOS transistor 1955 is connected to the D2 port of subcircuit N 1140. The other port of capacitor 1960 is connected to the clock 51 with the understanding that the CLKB port of subcircuit N 1140 and the capacitor 1960 must not receive the same clock signal.

Voltages VA1 at node 715 and VA2 at node 717 are connected to the NS1 and NS2 ports, respectively, of subcircuit N 1140. The voltages VA1 and VA2 can both be output voltages or input voltages depending upon the type of charge pump operation, i.e., a negative charge pump or a positive charge pump.

Figure 12:
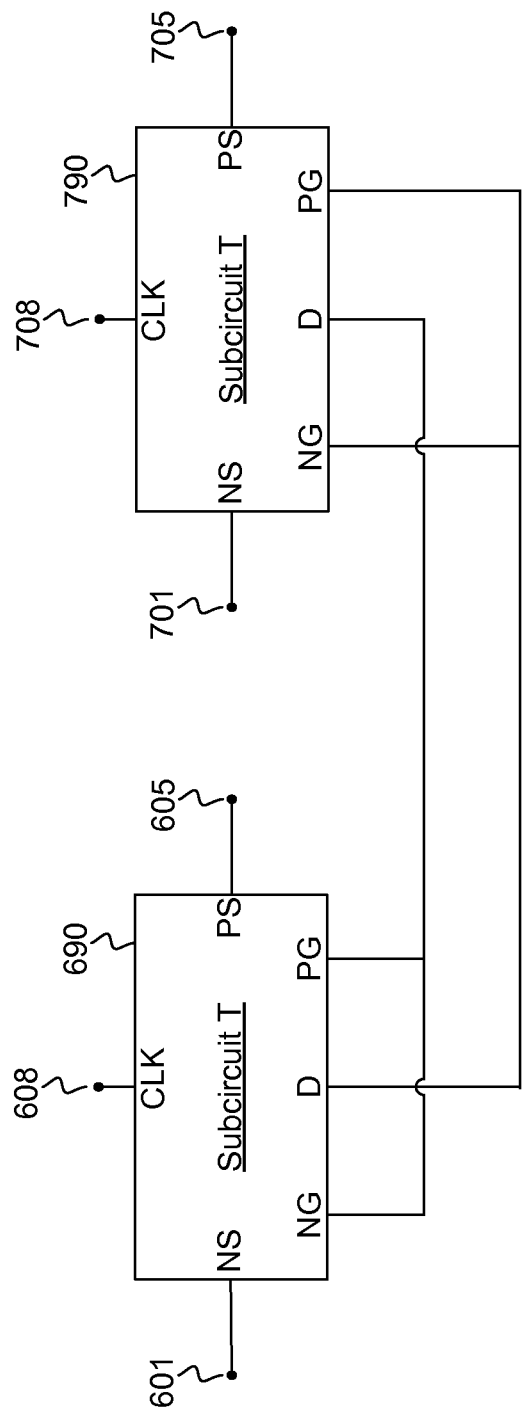
FIG. 12 illustrates an interconnection of two subcircuit T's to form a block circuit, herein referred to as subcircuit H.

FIG. 12 illustrates an interconnection of two subcircuit T's to form a block circuit, herein referred to as subcircuit H. The ports of subcircuit T 690 are referenced as follows: the NS port is given port reference NS1 at node 601; the PS port is given port reference PS1 at node 605; and the CLK port is given port reference CLKA at node 608. The ports of subcircuit T 790 are referenced as follows: the NS port is given port reference NS2 at node 701; the PS port is given port reference PS2 at node 705; and the CLK port is given port reference CLKB at node 708. The NG port and PG port of subcircuit T 690 both connect directly to the D port of subcircuit T 790. Similarly, the NG port and PG port of subcircuit T 790 both connect directly to the D port of subcircuit T 690.

Figure 13:
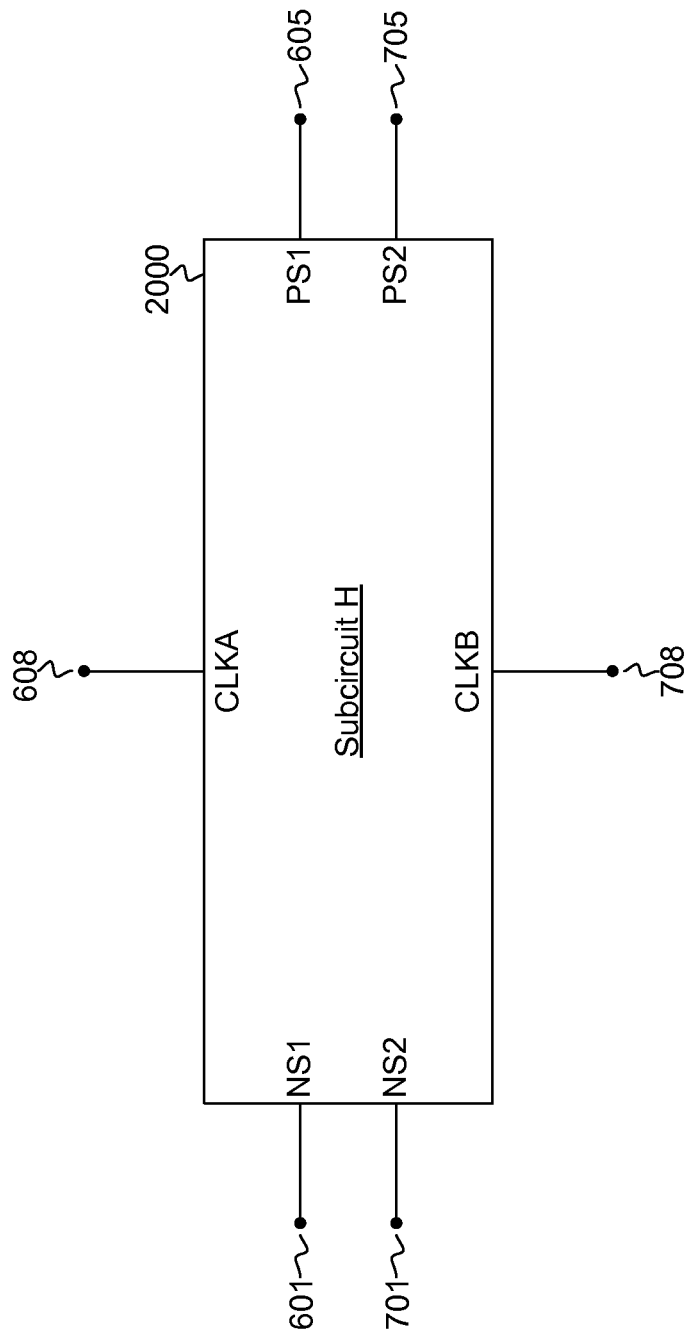
FIG. 13 illustrates a hierarchical block representation of a subcircuit H.

FIG. 13 illustrates a hierarchical block representation of a subcircuit H. The hierarchical block representation of a subcircuit H 2000 is equivalent to the circuit diagram in FIG. 12. The ports of subcircuit H 2000 correspond to the ports referenced in FIG. 12 and are summarized as follows: the clock signal ports are CLKA and CLKB; the left NMOS source ports are NS1 and NS2; and the right PMOS source ports are PS1 and PS2. The hierarchical block can be used in generating hierarchical schematics. Additionally, it would be understood that additional layout requirements, such as isolation wells with their respective isolation node connections, are global. Isolation nodes and methodologies are not drawn in this symbol since such nodes and methodologies are commonly known by a person having ordinary skill in the art, in particular for those who follow commonly practiced integrated circuit design techniques.

There is a rule in connecting the CLKA and the CLKB ports: the CLKA port and the CLKB port must receive opposite-phased (or out-of-phase) clocks. This means that if the designer uses clock signals 50 and 51 and the CLKA port receives the clocks signal 50, then the CLKB port must receive clock signal 51. Alternatively, if the CLKA port receives clock signal 51, then CLKB 708 must receive clock signal 50.

Figure 14:
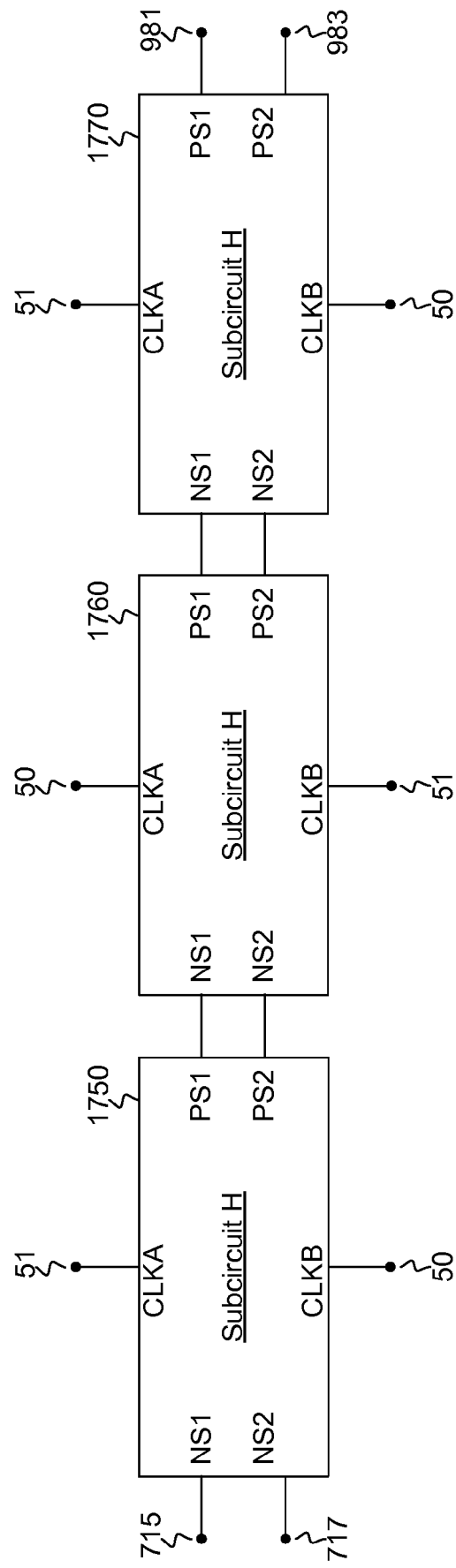
FIG. 14 illustrates another embodiment of the present invention for a dual array charge pump having multiple subcircuit H's.

FIG. 14 illustrates another embodiment of the present invention for a dual array charge pump using an array of subcircuit H's. There are three stages of the subcircuit H illustrated from left to right. The first stage subcircuit H 1750 is the left-most stage. A voltage VA1 at node 715 connected to the NS1 port of the subcircuit H 1750 and a voltage VA2 717 connected to its NS2 port. The voltages VA1 and VA2 can both be output voltages or input voltages depending upon the type of charge pump operation, i.e., a negative charge pump or a positive charge pump. The third stage subcircuit H 1770 is the right-most stage.

A voltage VB1 at node 981 is connected to the PS1 port of subcircuit H and a voltage VB2 at node 983 is connected to the PS2 port of subcircuit H. The voltages VB1 and VB2 can both be output voltages or input voltages depending upon the type of charge pump operation, i.e., a negative charge pump or a positive charge pump. It is noted that if the voltages VA1 and VA2 are inputs, then voltages VB1 and VB2 are outputs. Similarly, if the voltages VA1 and VA2 are outputs, then voltages VB1 and VB2 are inputs.

A subcircuit H 1760 is an intermediate stage in an array of subcircuit H's. The stages are connected by connecting the NS1 port of a subcircuit H with the PS1 port of a next subcircuit H and connecting the NS2 port of the subcircuit H with the PS2 port of the next subcircuit H (illustrated in FIG. 14). Any number of intermediate stages (including not having an intermediate stage) can be selected based on the charge pump requirements as determined by simulation, calculation, or other design specifications.

The rule for connecting clock signals 51 and 52 to the subcircuits is that they must alternate in the array. In other words, if one subcircuit H receives clock signal 50 at the respective CLKA port, then the adjacent subcircuit H must receive clock signal 51 at its respective CLKA port. Furthermore, the CLKA and CLKB ports of a subcircuit H must receive opposite-phased clocks. For instance, if the CLKA port of the subcircuit H receives clock signal 51, then the respective CLKB port of that subcircuit H must receive clock signal 50, and vice versa.

With respect to the operation of the various embodiments of the present invention for a charge pump, several circuit approaches for cascading single or dual arrays comprised of subcircuit T's were presented above. In order to further understand how to operate and how to construct such low input voltage charge pumps, the fundamental subcircuit T structure illustrated in FIGS. 2a-2b is of great importance. Referring to FIGS. 2a-2b, the qualitative theory of charge pump operation is as follows. First, during the transient when the clock signal applied at node 8 transitions from high to low, there can be conventional current flow from the NS port at node 1 to the D port at node 3 through the NMOS transistor 6.

This represents a positive charge flow from left to right onto the pump capacitor C 7 at the D port 3; ideally, there would be no loss.

Also, ideally there is no conventional current flow from right to left through either transistors 6 and 9. Second, during the transient when the clock signal applied at CLK 8 transitions from low to high, there can be conventional current flow from the D port at node 3 to the PS port at node 105 through the PMOS transistor 9. This represents positive charge flow from left to right off of the pump capacitor C 7 and through the PMOS transistor 9.

Again, ideally there would be no loss. However, in practice, there are sources of loss. In reality there is loss to the following: to the parasitic elements, to the voltage drop of the NMOS transistor 6 when it conducts current (e.g., conduction from left to right), to the voltage drop of the PMOS transistor 9 when it conducts current (e.g., conduction from left to right), to the reverse current through the PMOS transistor 9 when it blocks current (e.g., blocking from right to left), and to the reverse current through the NMOS 6 when it blocks current (e.g., blocking from right to left).

The circuit approaches of the present invention address ways to drive the gates NG at node 2 of NMOS 6 and PG at node 4 of PMOS 9 such that the charge transfer described above best approaches the ideal. The result is to transfer charge from left to right among the cascaded stages such that the voltage increases along the array from left to right. Moreover, the gates NG at node 2 and PG at node 4 are connected in order to allow third quadrant or close to third quadrant conduction in the NMOS transistor 6 and PMOS transistor 9. The idea of third quadrant conduction in an NMOS or PMOS transistor is commonly understood by a person having ordinary skill in the integrated circuit design field.

The first approach illustrated in FIGS. 3a-3b is one method to connect a charge pump array to create a large magnitude negative voltage or large magnitude positive voltage from a smaller input voltage of magnitude, Vin. Suitable clock waveforms are illustrated in FIG. 4. To create a positive charge pump, the charge pump output can be connected at node 400 having the voltage VB. The voltage VB at node 400 can be connected to an electrical load (not illustrated). In order to reduce ripples and to smooth the output waveform of the voltage VA at node 400, an output capacitor can also be connected.

In creating the positive charge pump, the voltage VA at node 25 can be connected to a fixed voltage potential of value between 0 and Vin, i.e., the supplied input voltage. The selection in this case of the fixed voltage potential for VA at node 25 can be selected based on a design procedure. It is noted that the electrical load can mean any type of circuit element or series of circuit elements requiring a voltage source.

Alternatively, to create a negative charge pump using the approach of FIGS. 3a-3b, the charge pump output can be connected at node 25 having the voltage VA. The voltage VA at node 25 can connect to an electrical load (not drawn). In order to reduce ripples and to smooth the output waveform for the voltage VA at node 25, an output capacitor can also be connected. In creating the negative charge pump, the voltage VB at node 400 can be connected to a fixed voltage potential of value between 0 and Vin, i.e., the supplied input voltage. The selection in this case of the fixed potential VB at node 400 can be based on the circuit design procedure. It is noted that typically the voltage VB at node 400 would be connected to ground (e.g., 0 Volt) in creating a negative charge pump.

The second approach illustrated in FIGS. 5a-5b is another method to connect a charge pump array to create a large magnitude negative voltage or large magnitude positive voltage from a smaller input voltage of magnitude, Vin. Suitable clock waveforms are shown in FIG. 4. To create a positive charge pump the charge pump output can be connected at the voltage VB at node 400. The voltage VB at node 400 can be connected to an electrical load (not drawn). In order to reduce ripples and to smooth the output waveform for the voltage VB at node 400, a large output capacitor may also be connected. In creating the positive charge pump, the voltage VA at node 25 can be connected to a fixed voltage potential of value between 0 and Vin, the supplied input voltage. The selection in this case of the fixed potential VA at node 25 can be part of the circuit design procedure.

Alternatively, to create a negative charge pump using the approach of FIGS. 5a-5b, the charge pump output can be connected at node 25 having the voltage VA. The voltage VA at node 25 can be connected to an electrical load (not drawn). In order to reduce ripples and to smooth the output waveform for the voltage VA at node 25, a large output capacitor may also be connected. In creating the negative charge pump, the voltage VB at node 400 is connected to a fixed voltage potential of value between 0 and Vin, the supplied input voltage. The selection in this case of the fixed potential VB at node 400 can be part of the circuit design procedure. It is noted that typically VB is connected to ground (i.e., 0 Volt) in creating a negative charge pump.

The third approach of FIGS. 8a-8b is a method to connect dual charge pump arrays to create large magnitude negative voltages or large magnitude positive voltages from a smaller input voltage of magnitude, Vin. Suitable clock waveforms to drive the charge pump are shown in FIG. 4. In the dual array approach, ideally charge can flow from left to right along two independent branches: one branch (array) is defined from VA1 at node 715 to VB1 at node 981; and another branch (array) is defined from VA2 at node 717 to VB2 at node 983. Also, in the dual array approach under certain design conditions, VB1 at node 981 and VB2 at node 983 could be designed to be independent connections. Similarly, VA1 at node 715 and VA2 at node 717 could be designed to be independent connections.

In designing a positive charge pump, the charge pump output can be connected at node 981 having the voltage VB1 and node 983 having the voltage VB2. The voltage VB1 at node 981 can be connected to an electrical load and output capacitor (not drawn), and the voltage VB2 at node 983 can be connected to an electrical load and output capacitor (not drawn). It is possible under certain design conditions to leave the voltages VB1 at node 981 and VB2 at node 983 separate (i.e., not connected to each other). However, the simplest design approach is to connect VB1 at node 981 and VB2 at node 983 together to form a single positive charge pump output.

Also, in designing a positive charge pump, the voltages VA1 at node 715 and VA2 at node 717 can be fixed voltages. The voltages VA1 at node 715 can be connected to a fixed voltage between 0 and Vin. Similarly, VA2 at node 717 can be connected to a fixed voltage between 0 and Vin. It is possible under certain design conditions to leave VA1 at node 715 and VA2 at node 717 separate (i.e., not connected to each other). However, the simplest design approach is to connect VA1 at node 715 and VA2 at node 717 together to the same potential.

In designing a negative charge pump, the charge pump output can be connected at node 715 having the voltage potential VA1 and at node 717 having the voltage potential VA2. The voltage potential VA1 at node 715 can be connected to an electrical load and output capacitor (not drawn), and the voltage potential VA2 at node 717 can be connected to an electrical load and output capacitor (not drawn). It is possible under certain design conditions to leave the voltages VA1 at node 715 and VA2 at node 717 separate, i.e., unconnected from each other. However, the simplest design approach is to connect the voltages VA1 at node 715 and VA2 717 together to form a single negative charge pump output.

Also, in designing a negative charge pump, the voltages VB1 at node 981 and VB2 at node 983 can be connected to fixed voltages. The voltage VB1 at node 981 can be connected to a fixed voltage between 0 and Vin. Similarly, the voltage VB2 at node 983 can be connected to a fixed voltage between 0 and Vin. It is possible under certain design conditions to leave the voltages VB1 at node 981 and VB2 at node 983 separate (i.e., not connected to each other). However, the simplest design approach is to connect the voltages VB1 at node 981 and VB2 at node 983 together to the same potential.

The fourth approach of FIGS. 11a-11b is a method to connect a dual array charge pump to create large magnitude negative voltages or large positive voltages from a smaller input voltage of magnitude, Vin. Suitable clock waveforms are illustrated in FIG. 4 to drive the dual array charge pump. In designing a positive charge pump, the charge pump output can be connected at the voltages VB1 at node 981 and VB2 at node 983. The voltage VB1 at node 981 can be connected to an electrical load and output capacitor (not drawn), and the voltage VB2 at node 983 can be connected to an electrical load and output capacitor (not drawn). It is possible under certain design conditions to leave the voltages VB1 at node 981 and VB2 at node 983 separate (i.e., not connected to each other). However, the simplest design approach is to connect the voltages VB1 at node 981 and VB2 at node 983 together to form a single positive charge pump output.

Also, in designing a positive charge pump, the voltages VA1 at node 715 and VA2 at node 717 can be connected to fixed voltages. The voltage VA1 at node 715 can be connected to a fixed voltage between 0 and Vin. Similarly, the voltage VA2 at node 717 can be connected to a fixed voltage between 0 and Vin. It is possible under certain design conditions to leave the voltages VA1 at node 715 and VA2 at node 717 separate (i.e., not connected to each other). However, the simplest design approach is to connect the voltages VA1 at node 715 and VA2 at node 717 together to the same potential.

In designing a negative charge pump, the charge pump output can be connected at nodes 715 having the potential VA1 and 717 having the potential VA2. The voltage VA1 at node 715 can be connected to an electrical load and output capacitor (not drawn), and the voltage VA2 at node 717 can be connected to an electrical load and output capacitor (not drawn). It is possible under certain design conditions to leave the voltages VA1 at node 715 and VA2 at node 717 separate (i.e., not connected with each other). However, the simplest design approach is to connect the voltages VA1 at node 715 and VA2 at node 717 together to form a single negative charge pump output.

Also, in designing a negative charge pump, the voltages VB1 at node 981 and VB2 at node 983 can be connected to fixed voltages. The voltage VB1 at node 981 can be connected to a fixed voltage between 0 and Vin. Similarly, VB2 at node 983 can be connected to a fixed voltage between 0 and Vin. It is possible under certain design conditions to leave VB1 at node 981 and VB2 at node 983 separate (i.e., not connected to each other). However, the simplest design approach is to connect the voltages VB1 at node 981 and VB2 at node 983 together to the same potential.

The fifth approach illustrated by FIG. 14 is a method to connect dual charge pump arrays to create large magnitude negative voltages or large positive voltages from a smaller input voltage of magnitude, Vin. Suitable clock waveforms are shown in FIG. 4 to drive the charge pump. In designing a positive charge pump, the charge pump output can be connected at the voltages VB1 at node 981 and VB2 at node 983. The voltage VB1 at node 981 can be connected to an electrical load and an output capacitor (not drawn), and VB2 at node 983 can be connected to an electrical load and an output capacitor (not drawn). It is possible under certain design conditions to leave the voltages VB1 at node 981 and VB2 at node 983 separate (i.e., not connected with each other). However, the simplest design approach is to connect the voltages VB1 at node 981 and VB2 at node 983 together to form a single positive charge pump output.

Also, in designing a positive charge pump, the voltages VA1 at node 715 and VA2 at node 717 are connected to fixed voltages. The voltage VA1 at node 715 can be connected to a fixed voltage between 0 and Vin. Similarly, the voltage VA2 at node 717 can be connected to a fixed voltage between 0 and Vin. It is possible under certain design conditions to leave the voltages VA1 at node 715 and VA2 at node 717 separate (i.e., not connected with each other). However, the simplest design approach is to connect the voltages VA1 at node 715 and VA2 717 together to the same potential.

In designing a negative charge pump, the charge pump output can be connected at the voltages VA1 at node 715 and VA2 at node 717. The voltage VA1 at node 715 can be connected to an electrical load and output capacitor (not drawn), and VA2 at node 717 can be connected to an electrical load and an output capacitor (not drawn). It is possible under certain design conditions to leave the voltages VA1 at node 715 and VA2 at node 717 separate (i.e., not connected to each other). However, the simplest design approach is to connect the voltages VA1 at node 715 and VA2 at node 717 together to form a single negative charge pump output.

Also, in designing a negative charge pump, the voltages VB1 at node 981 and VB2 at node 983 can be connected to fixed voltages. The voltage VB1 at node 981 can be connected to a fixed voltage between 0 and Vin. Similarly, the voltage VB2 at node 983 can be connected to a fixed voltage between 0 and Vin. It is possible under certain design conditions to leave VB1 981 and VB2 983 separate (i.e., not connected to each other). However, the simplest design approach is to connect the voltages VB1 at node 981 and VB2 at node 983 together to the same potential.

In alternative embodiments of the present invention, the circuit approaches described above use a fundamental subcircuit T and duplicate the subcircuit T in creating or cascading single array or dual array charge pumps. It can be understood by a person having ordinary skill in the art that there are many permutations of the values and sizes of the fundamental components such as pump capacitors, NMOS transistors, and PMOS transistors used in the present invention. Thus, it is possible to derive an embodiment which uses the basic subcircuit T, but within each instance, the components have unique values.

By way of example, an NMOS transistor in one subcircuit T having a width equal to 300 um, while in another example, the width is equal to 400 um. Also, in another example, a pump capacitor may have a value of 10 pf in one subcircuit T, while in another subcircuit T, a pump capacitor may have a value of 100 pf. Furthermore, various permutations can be used within the same cascaded pump design. Thus, it is possible to design with many sizes. Therefore, it is to be understood that the various embodiments and permutations using the subcircuit T are intended to be covered by the present invention.

Generally, the present invention allows for a charge pump that can operate at low supply voltages, e.g., less than 1V.

Furthermore, the integrated-circuit area for the charge pump can be optimized by distributing the charge-pump cells among multiple circuit branches. The gate nodes for the charge pump can be systematically connected using a general formula and algorithm. Also, inter-branch and intra-branch gate-connection approaches can be generalized and suitable for a distributed array of charge pump cells. Various approaches for building a charge pump with a plurality of branches and a plurality of stages (also referred to as levels) are disclosed the present invention.

Figure 15:
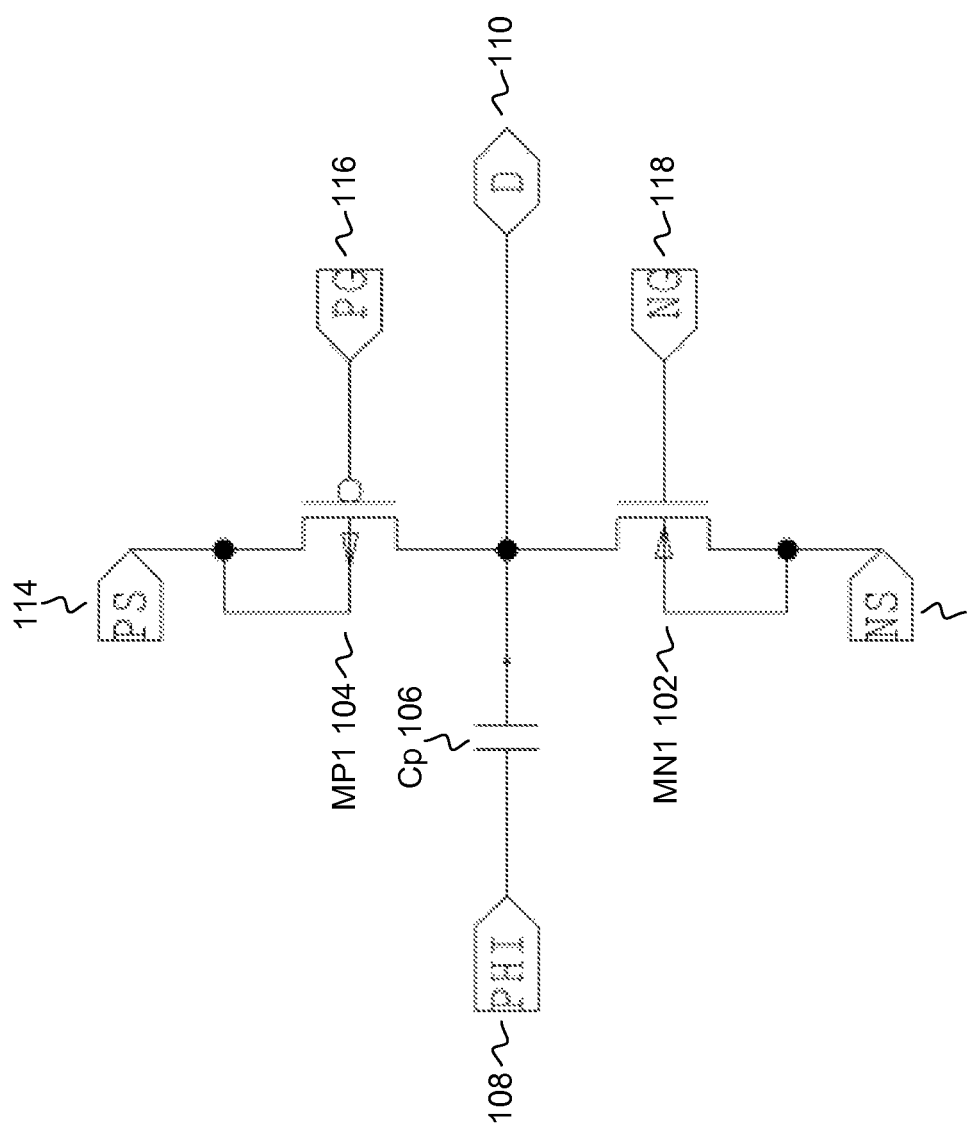
FIG. 15 illustrates a circuit diagram of a T-circuit block for a charge pump of the present invention.

FIG. 15 illustrates a circuit diagram of a T-circuit block for a charge pump of the present invention. An NMOS MN1 102, a PMOS MP1 104, and a capacitor Cp 106 are connected to form a fundamental T-circuit block (also referred to as a T-circuit cell or cell). One end of the capacitor Cp 106 is connected to the drain of the NMOS MN1 102 and to the drain of the PMOS MP1 104. This common-drain node is labeled D 110. The other node of the capacitor Cp 106 is labeled PHI 108. The source of the NMOS MN1 102 is labeled NS 112, and the source of the PMOS MP1 104 is labeled PS 114. Also, the gate of the NMOS MN1 102 is labeled NG 118, and the gate of the PMOS MP1 104 is labeled PG 116. The source NS 112 is connected to the body of NMOS MN1 102, and the source PS 114 is connected to the body of PMOS MP1 104.

The pump capacitor Cp 106, the PMOS MP1 104, and the NMOS MN1 102 can be designed to minimize switch loss and to meet the overall loading conditions of the charge pump. In addition, the design can also require a signal at the node PHI 108 with a particular frequency. Thus, the design variables are the pump capacitance Cp 106, the size and area of PMOS MP1 104 and NMOS MN1 102, and the frequency and voltage level of a clock signal applied to the node PHI 108.

Figure 16:
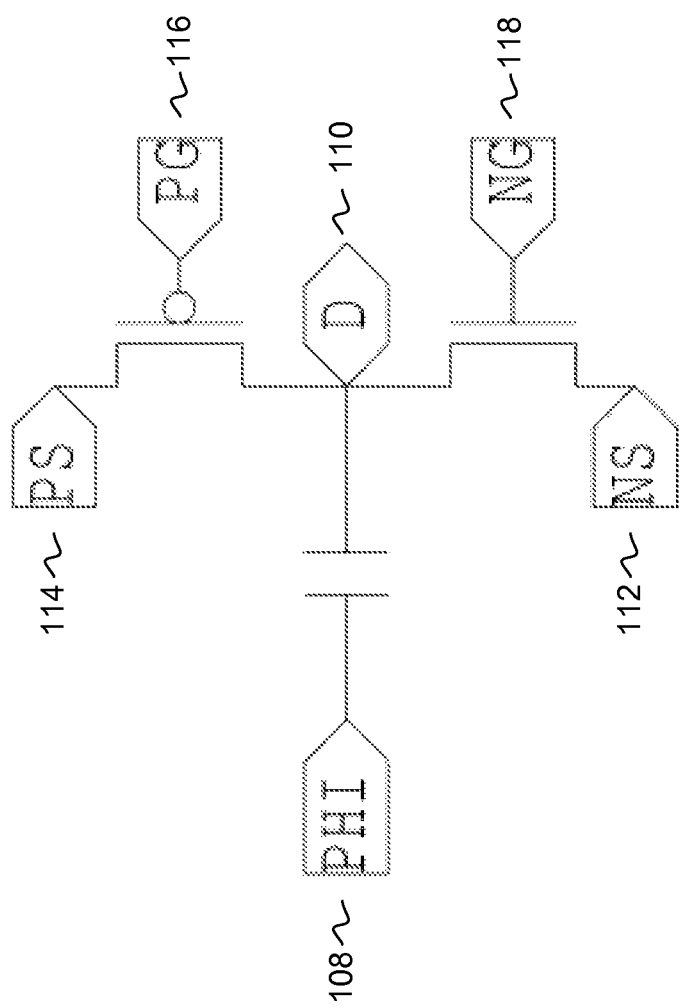
FIG. 16 illustrates a circuit diagram of another T-circuit block for a charge pump of the present invention.

FIG. 16 illustrates a circuit diagram of a T-circuit block for a charge pump of the present invention. The T-circuit block can be an alternate pictorial representation of the T-circuit block of the present invention without the body connections drawn to aid in the ease of illustrating multiple T-circuit blocks connected together.

Figure 17:
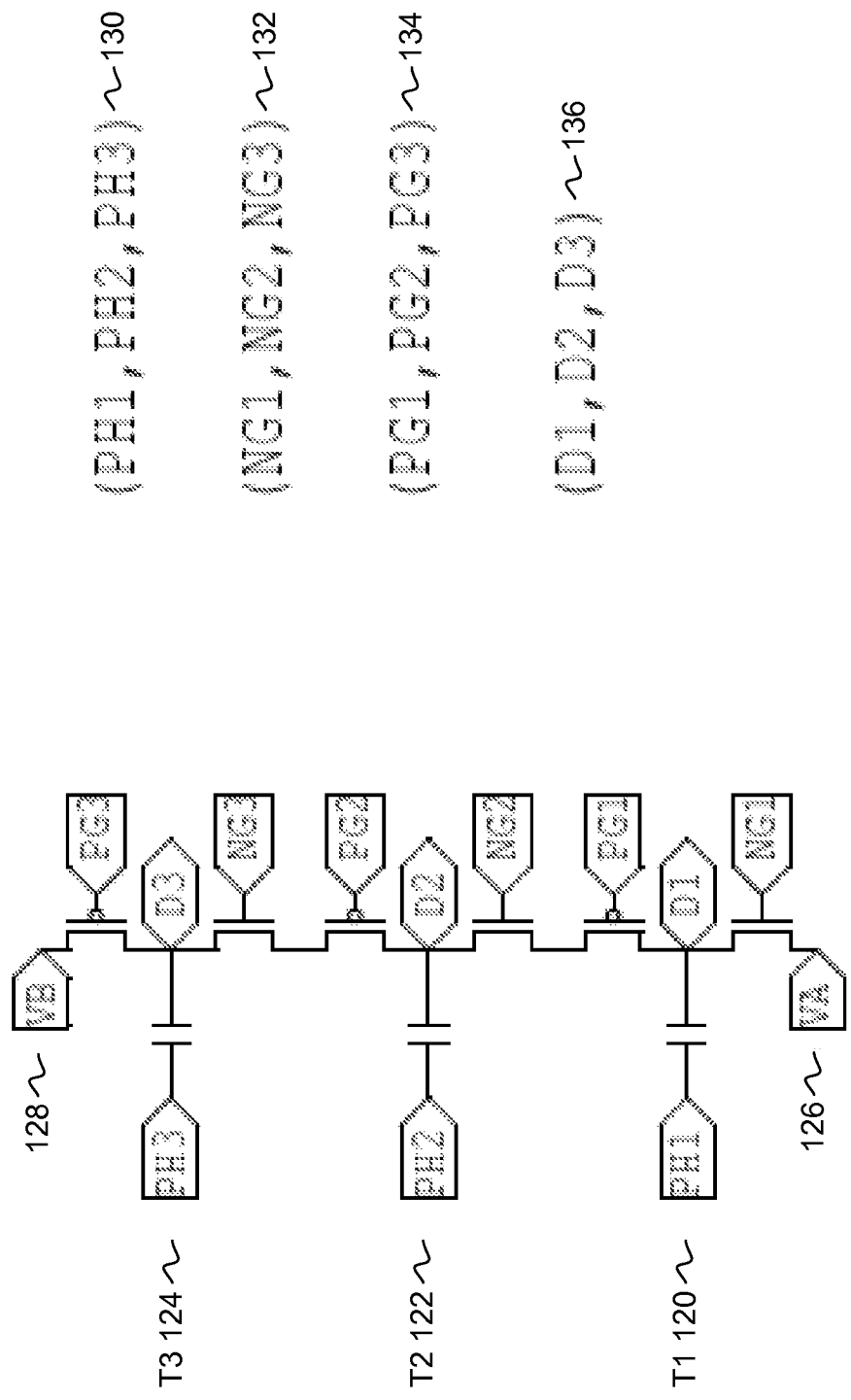
FIG. 17 illustrates a circuit diagram of a T-circuit branch of the present invention.

FIG. 17 illustrates a circuit diagram of a T-circuit branch of the present invention. A branch of a charge pump of the present invention (also referred to as a T-circuit branch) comprises three serially-connected T-circuit blocks, labeled T1 120, T2 122, and T3 124. In this branch, the first T-circuit cell T1 120 can be referred to as being on level 1 or in the first stage. The second T-circuit cell T2 122 can be referred to as being on level 2 or the second stage. Finally, the third T-circuit cell T3 124 can be referred to as being on level 3 or the third stage.

As a convention for easy reference, levels can represent the position of a cell within a branch starting from the bottom of the branch and going upwards from there. The flow of conventional current will occur from the lowest level or position towards the highest level or position. Also, as a convention, the NMOS source of the first T-circuit cell T1 120 can be given the node label VA 126. The node VA 126 can be an endpoint of the branch. For convention, the PMOS source of the third or final T-circuit cell T3 124 can be given the node label VB 128. The node VB 128 is also a branch endpoint. Phase nodes connected to the capacitors of the T-circuit cells T1 120, T2 122, and T3 124 can be identified and referenced by a vector notation, e.g., (PH1, PH2, PH3) 130. Similarly, the NMOS gate nodes and PMOS gate nodes for the cells can be identified and referenced by a vector notation, e.g., (NG1, NG2, NG3) 132 and (PG1, PG2, PG3) 134, respectively. The common-drain nodes also may be written in a vector notation (D1, D2, D3) 136.

In general, the series connections occur by connecting the PMOS source of a T-circuit block at one level to the NMOS source of the T-circuit block at the next level in the sequence or branch. By way of example, the PMOS source of the T-circuit block T1 120 connects to the NMOS source of the T-circuit block T2 122. The NMOS source of the first-level T-circuit block is assigned the node-label VA 126 and the PMOS source of the final-level T-circuit block is assigned the node-label VB 128.

Figure 18:
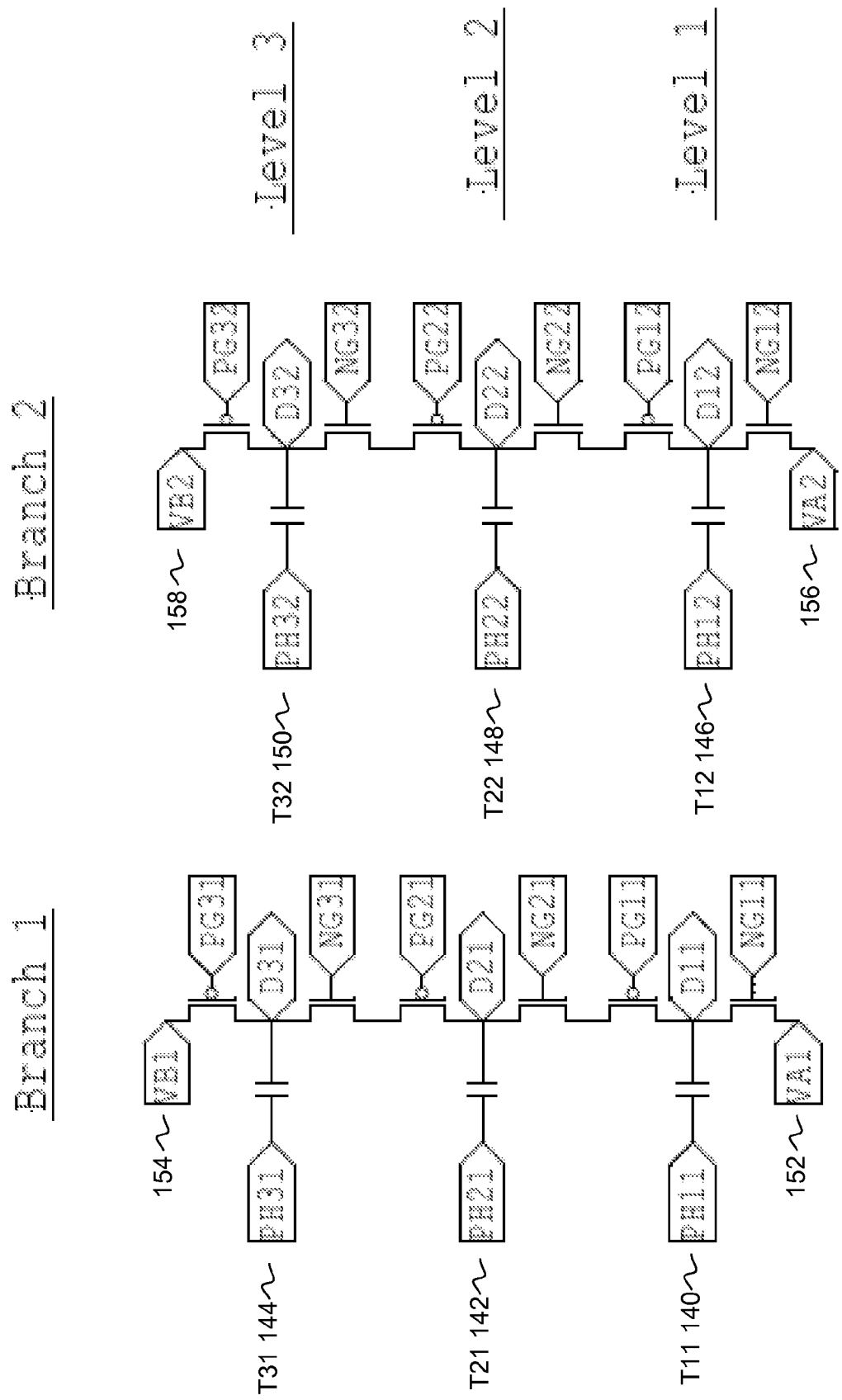
FIG. 18 illustrates a circuit diagram of two T-circuit branches of the present invention to form an array of T-circuit blocks.

FIG. 18 illustrates a circuit diagram of two T-circuit branches of the present invention to form an array of T-circuit blocks. Two branches, referred to as branch 1 and branch 2, comprise T-circuit cells of the present invention. Branch 1 comprises serially-connected T-circuit cells T11 140, T21 142, and T31 144. Branch 2 comprises serially-connected T-circuit cells T12 146, T22 148, and T32 150.

When there is more than one branch and more than one level, a matrix representation for the nodes of the branch and levels can be used to identify and reference the T-circuit cells. By way of example, the T-circuit cell T11 140 is at the first level, level 1, and within the first branch, branch 1. The T-circuit cell T32 150 is at the third level, level 3, and within the second branch, branch 2. The level indicates the T-circuit cell position within its respective branch. As a convention, in branch 1, the NMOS source of the first-level T-circuit block is assigned the node-label VA1 152 and the PMOS source of the final-level T-circuit block is assigned the node-label VB1 154. Also following this convention, in branch 2, the NMOS source of the first-level T-circuit block is assigned the node-label VA2 156 and the PMOS source of the final-level T-circuit block is assigned the node-label VB2 158. It should be understood from the schematic that one level T-circuit is connected to the next level T-circuit in series by connecting the lower T-circuit PMOS source to the next T-circuit NMOS source.

Figure 19:
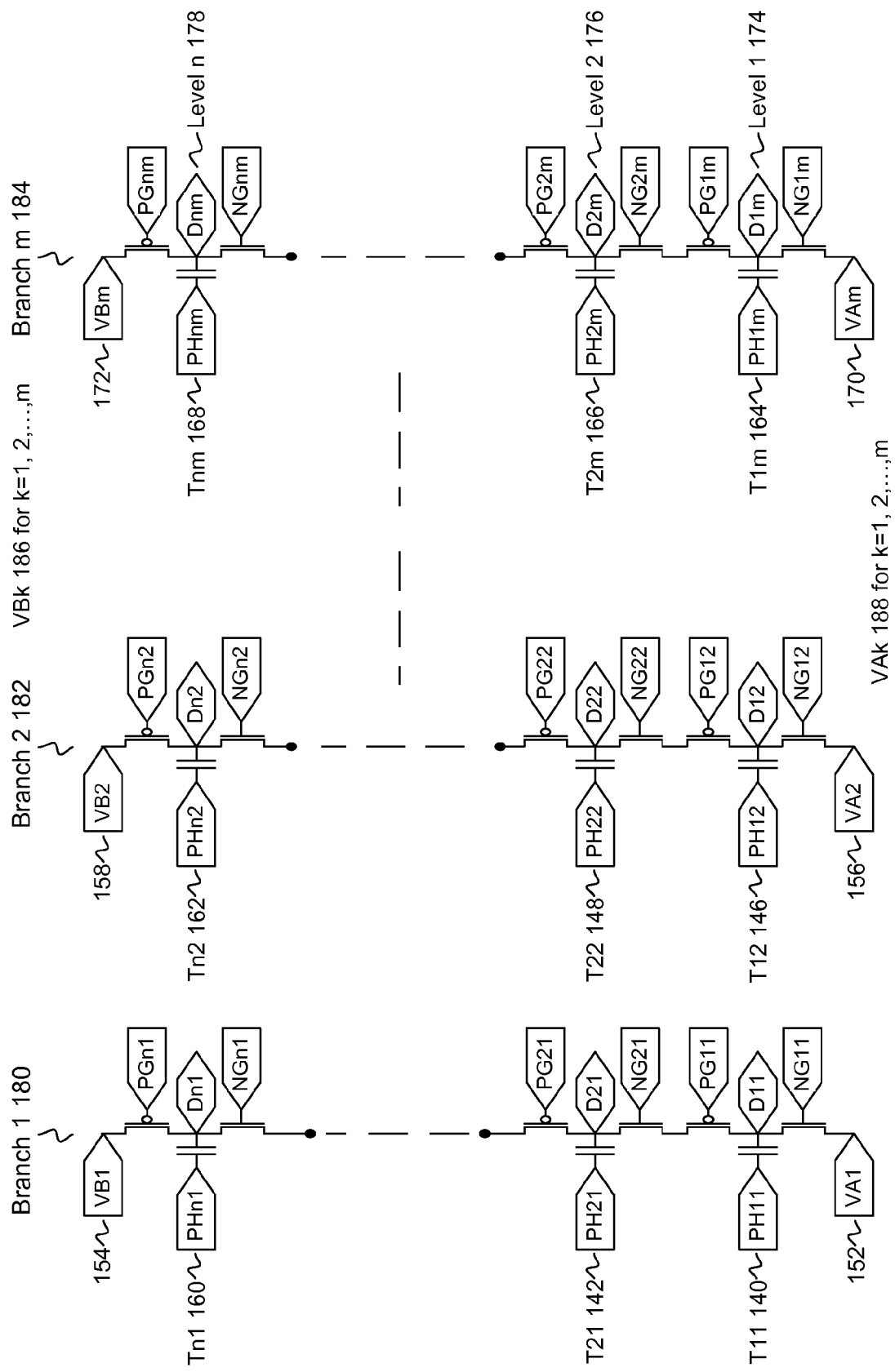
FIG. 19 illustrates a circuit diagram of a generalized array for a charge pump of the present invention having m circuit branches, where each branch comprises n T-circuit blocks.

FIG. 19 illustrates a circuit diagram of a generalized array of the present invention having m circuit branches, where each branch comprises n T-circuit blocks. A distributed charge-pump array of the present invention comprises a matrix of T-circuit cells connected in series to form n levels and having m branches. An identification and referencing scheme as discussed above can be used for the distributed charge-pump array. As such, the n levels are level 1 174, level 2 176, and onward to level n 178. The m branches are branch 1 180, branch 2 182, and onward through to branch m 184.

The first branch, branch 1 180, comprises series connected T-circuit cells T11 140, T21 142, and through to T-circuit cell Tn1 160. The second branch, branch 2 182, comprises serially-connected T-circuit cells T12 146, T22 148, and through to T-circuit cell Tn2 162. The mth-branch, branch m 184, comprises serially-connected T-circuit cells T1m 164, T2m 166, and through to T-circuit cell Tnm 168. The endpoint branch nodes formed by the NMOS sources of level 1 174's T-circuit cells are assigned the labels VA1 152, VA2 156, through VAm 170 with a label index VAk 188 where k=1, 2, . . . , and m. Similarly, the endpoint branch nodes formed by the PMOS sources of level n 178's T-circuit cells are assigned the labels VB1 154, VB2 158, through VBm 172 with a label index VBk 186 where k=1, 2, . . . , and m.

The number of levels and the number of branches of the distributed charge-pump array of the present invention can be design variables. A charge pump output voltage can vary directly with the number of levels or stages. In this case, stages can be equivalent to levels. For a given output loading condition, e.g., a current output, the voltage output will also depend upon pump capacitance and switch loss. Allowing the number of branches to be variable allows an optimization of the pump capacitor and switch area. For a fixed overall pump capacitance, the amount of pump capacitance and amount of current per stage will decrease as the number of branches increases. This is a concept of distribution. Each branch represents a parallel path for the current. Alternatively, for a fixed pump capacitor size, e.g., the capacitance Cp 106 illustrated in FIG. 15, the available output current will increase as the number of branches increases. The number of levels and the number of branches can be accordingly selected to meet a specification for the charge pump.

Figure 20:
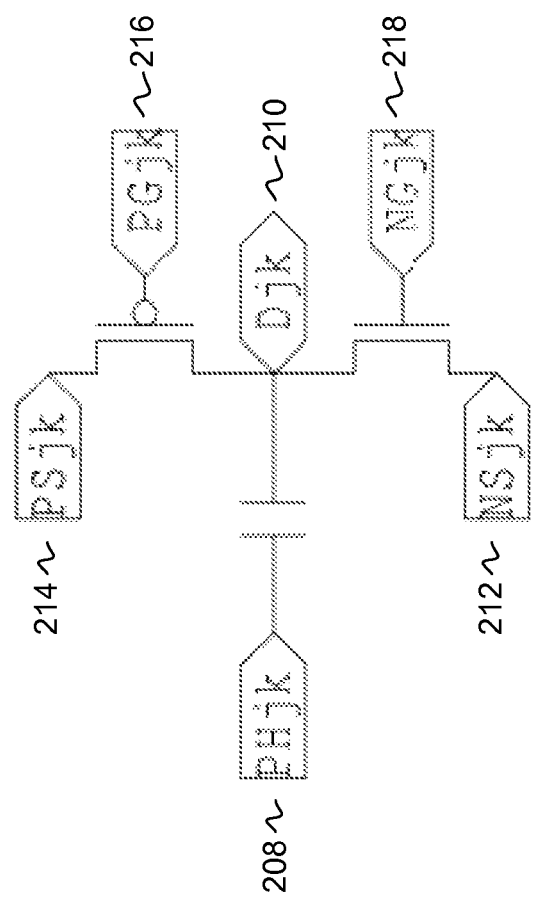
FIG. 20 illustrates a circuit diagram of a distributed-array representation of the present invention having a single T-circuit block.

FIG. 20 illustrates a circuit diagram of a distributed-array representation of the present invention having a single T-circuit block. A matrix convention for labeling the nodes of an arbitrary T-circuit cell within a distributed charge pump network comprised of T-circuit cells can be as follows. Using an index j 220 to represent the n levels and an index k 222 to represent the m branches, each node is assigned a matrix position jk as follows: the phase voltage becomes PHjk 208; the common drain voltage becomes Djk 210; the NMOS source becomes NSjk 212; the PMOS source becomes PSjk 214; the PMOS gate becomes PGjk 216; and the NMOS gate becomes NGjk 218.

Within a single branch, the intra-branch connections are such that the NMOS source of level j+1 will connect to the PMOS source of level j, where j is the j-index 220 with values 1, 2, 3, . . . , and n. A general algorithm is derived here for connecting the nodes of a distributed charge-pump system with m branches labeled by k 222 and n levels labeled by j 220.

In order for a distributed charge-pump system to pump charge, the phase connections PHjk 208 must be connected to time varying voltage signals. A subset of distributed charge-pump circuits of the present invention are generated by applying the condition (or algorithm) PHjk=PHA when the sum j+k is even and PHjk=PHB when the sum j+k is odd for all index j 220 and for all index k 222. In this algorithm, the condition, PHjk=PHA when j+k=even, can mean connect all nodes PHjk to a common voltage node (or signal) PHA when j+k is even. Similarly, the condition PHjk=PHB when j+k=odd can mean connect all nodes PHjk to a common voltage node (or signal) PHB when j+k is odd. Alternatively, other indexing schemes for the distributed charge-pump system can yield other conditions for setting the various connections. A person having ordinary skill in the art can implement such other indexing schemes and conditions using the present invention.

Given the above condition for the PHjk in terms of the nodes PHA and PHB, an inter-branch algorithm can have the NMOS gate NGjk 218 and the PMOS gate PGjk 216 connected to the common-drain nodes Djk 210. Furthermore, according to an inter-branch design rule, NGjk=Djq and PGjk=Djr, where q and r are indices which can also be used to represent the branch number 1, 2, . . . , and m. In an embodiment of the present invention, the sum of the k-index and q-index must be an odd number (i.e., k+q is equal to an odd number), and the sum of the k-index and the r-index must be an odd number as well (i.e., k+r is equal to an odd number).

In such algorithm, the node equality sign NGjk=Djq means to connect the nodes NGjk and Djq together. An electrical engineer would recognize this to mean the nodes have the same voltage potential. This concept also applies to the condition PGjk=Djr which means to physically connect nodes PGjk and Djr. A subset of distributed circuits of the present invention is generated by forcing an additional condition that the q-index does not equal the r-index in the above algorithm.

This is equivalent to stating the node connection NGjk=Djq does not equal (and does not connect) to the node connection PGjk=Djr.

A further subset of distributed circuits of the present invention is generated by forcing an additional condition that only one connection is made according to NGjk=Djq and according to PGjk=Djr, where j is the level index, and k, q, and r represent the branch number. This embodiment eliminates the possibility of connecting a common-drain node from one branch to another common-drain node of another branch. Or stated in terms of an algorithm, a common-drain node may only connect to an NMOS-gate node of a T-circuit cell or to a PMOS-gate node of a T-circuit cell. A common-drain node Djk is not allowed to connect to other common-drain nodes. This embodiment forces common-level, common-drain nodes to connect only to gates and not to other branch drain nodes.

A distributed charge pump allows for the branch endpoint nodes VAk 188 and the branch endpoint nodes VBk 186, where the k-index is 1, 2, . . . , and m, to be independent nodes. A subset of distributed circuits of the present invention are generated by imposing an additional condition that all endpoint nodes VAk 188 connect together to form a single node VA according to the algorithm VAk=VA for all k=1, 2, . . . , and m. An additional subset also imposes all endpoint nodes VBk 186 connect together to form a single branch node VB according to the algorithm VBk=VB for all k=1, 2, . . . , and m.

Figure 21:
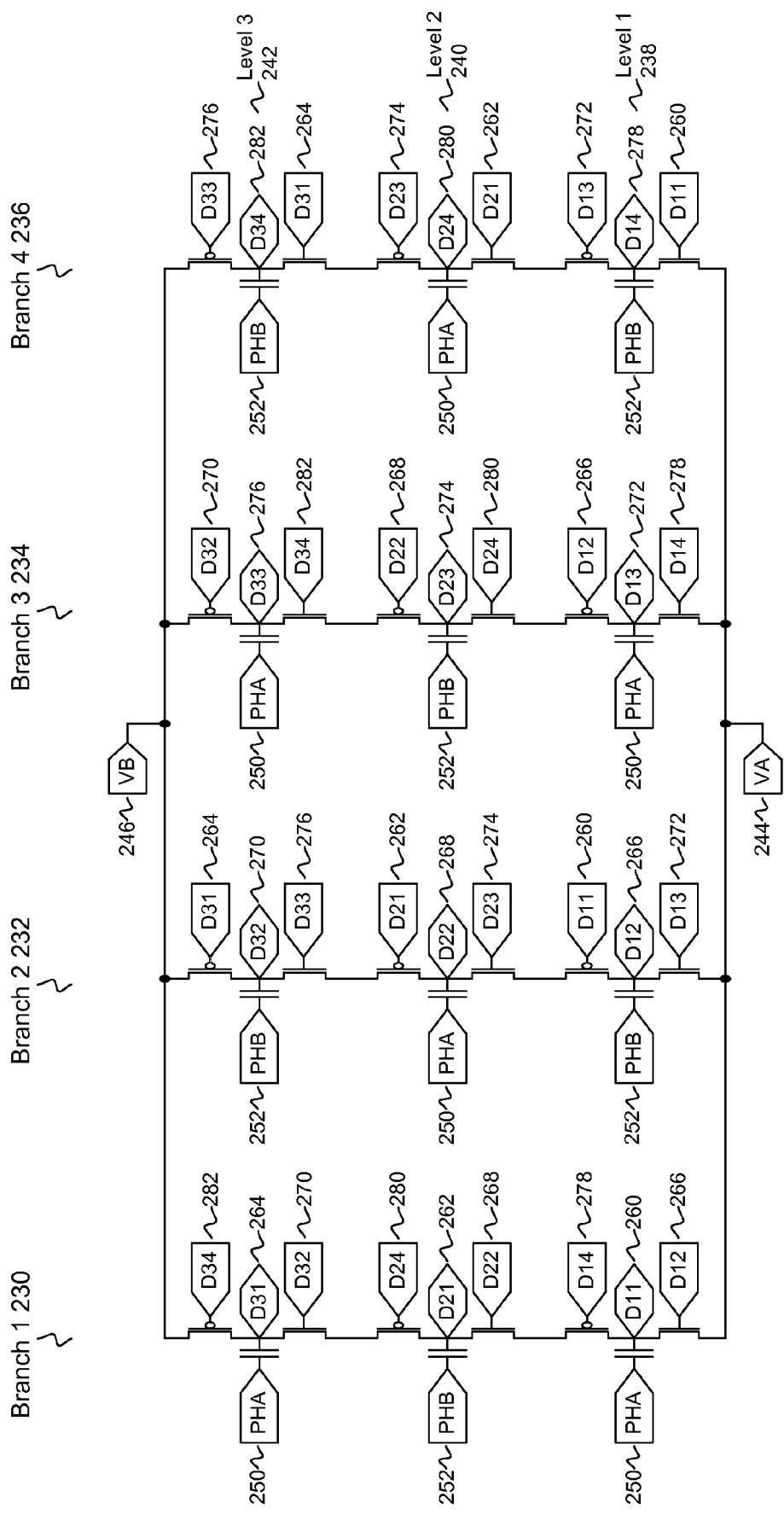
FIG. 21 illustrates a circuit diagram of a distributed, three-level, four-branch charge-pump array of the present invention.

FIG. 21 illustrates a circuit diagram of a distributed, three-level, four-branch charge-pump array of the present invention. A four-branch, three-level distributed charge pump of the present invention using the above matrix node-connection algorithms is provided. There are four branches, branch 1 230, branch 2 232, branch 3 234, and branch 4 236, connected together at branch endpoint nodes VA 244 and VB 246 according to the algorithm constraints VAk=VA and VBk=VB for all k. There are three levels of T-circuit branches: level 1 238, level 2 240, and level 3 242. The phase nodes PHjk 208 have been connected according to PHjk=PHA 250, when j+k is even, and according to PHjk=PHB 252 when j+k is equal to an odd number. The NMOS gate and PMOS gate connections of each T-circuit cell are written in terms of common-drain node voltages Djk, where j is the jth level and k is the kth branch. An electrical engineer skilled in the art of reading schematics would understand the use of node labels: a node label represents a connection. When two nodes use the same label, this means the nodes are connected or have the same voltage potential.

By way of illustration and according to the above algorithms, the first-level, first-branch T-circuit common-drain node D11 260 connects to the first-level, second-branch PMOS gate and also to the first-level, fourth-branch NMOS gate. The second-level, first-branch T-circuit common-drain node D21 262 connects to the second-level, second-branch PMOS gate and also to the second-level, fourth-branch NMOS gate. The third-level, first-branch T-circuit common drain node D31 264 connects to the third-level, second branch PMOS gate and also to the third-level, fourth-branch NMOS gate.

For further illustration, branch 2 232 connections for common-drain nodes are connected to the following nodes D12 266, D22 268, and D32 270, branch 3 234 connections for common-drain nodes are connected to the following nodes D13 272, D23 274, and D33 276, and the branch 4 236 connections for common-drain nodes are connected to the following nodes D14 278, D24 280, and D34 282.

As a design variable, the frequency of the signals applied at the clock phase nodes PHA 250 and PHB 252 can affect the charge-pump voltage. A design approach can be to use out-of-phase, e.g., a 180-degrees phase difference, non-overlapping square waves to create the signals applied to the nodes PHA 250 and PHB 252. When this is the case, the connection algorithms derived for realizing the distributed charge-pump arrays can automatically provide the correct signals at each NMOS and PMOS gate node within the array. One goal of the distributed array charge pump of the present invention is to allow for low voltage, e.g., less than one volt, operation. Therefore, a less-than-one-volt, non-overlapping clock signal can be applied at both the nodes PHA 250 and PHB 252.

Another design and operation specification for a charge pump of the present invention can be the type of charge pump, e.g., a charge pump having a positive voltage output or a negative voltage output. The type of charge pump can be determined through the control of the endpoint branch nodes VA 244 and VB 246. When the branch node VA 244 is fixed to a voltage level between ground and supply, which is typically the same level as the clock pedestals of the nodes PHA 250 and PHB 252, then the output VB 246 becomes the output voltage of the charge pump. In this case, the output node VB 246 will be positive or greater than 0V, and the classification of the charge pump will be "positive" for realizing a positive charge pump. When the node VB 246 is fixed to a voltage level, typically a voltage between supply and ground, then the node VA 244 becomes the charge pump output, which will be negative with respect to node VB 246. Thus, in this case, the charge pump of the present invention can be operated as a negative charge pump.

Figure 22:
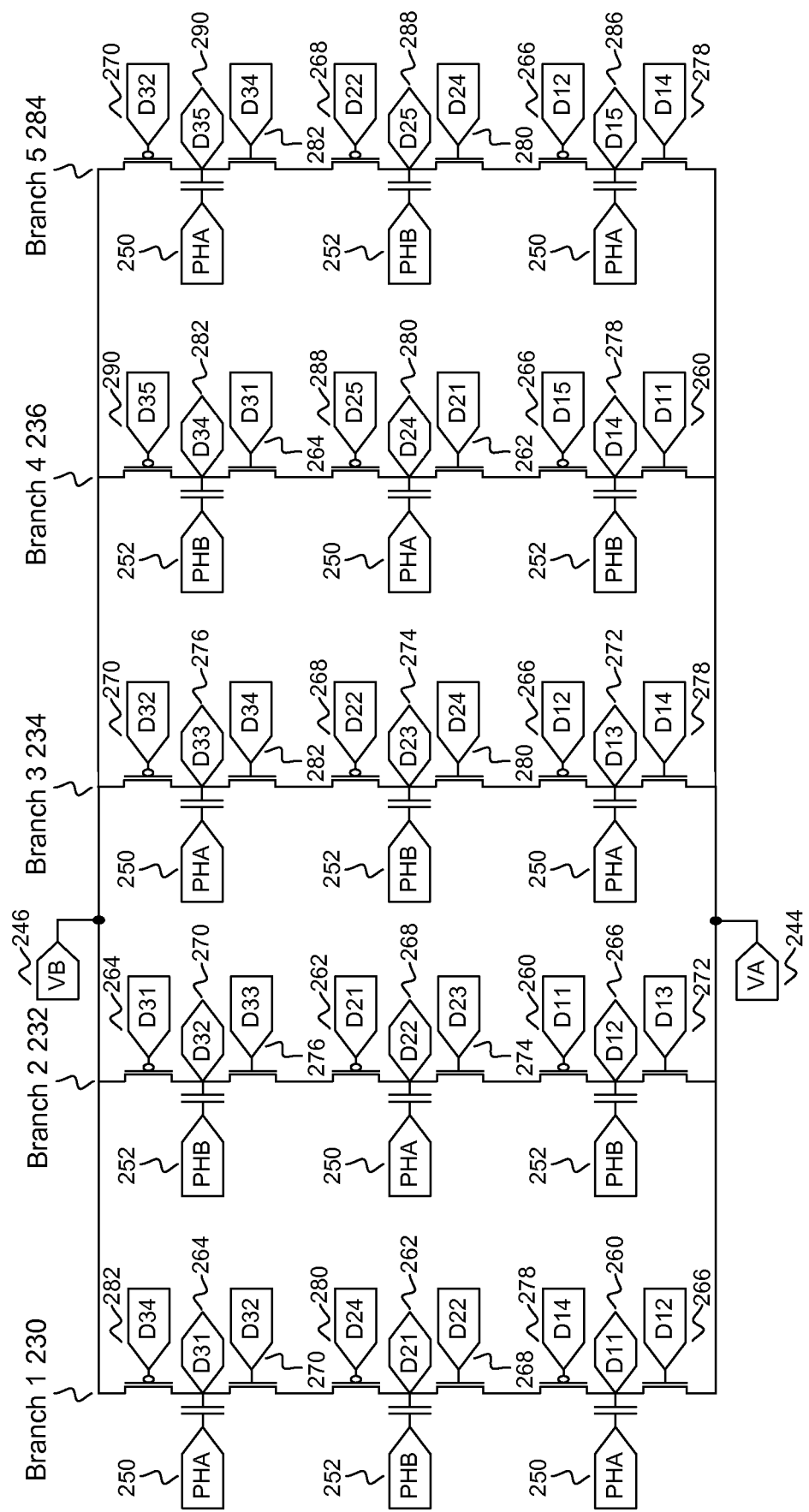
FIG. 22 illustrates a circuit diagram of a distributed, three-level, five-branch charge-pump array of the present invention.

FIG. 22 illustrates a circuit diagram of a distributed, three-level, five-branch charge-pump array of the present invention. A five-branch, three-level distributed charge pump of the present invention can use the above stated matrix node-connection algorithms. For instance, an additional branch 5 284 connects to three T-circuit cells with common-drain nodes D15 286, D25 288, and D35 290. The endpoint nodes are again connected together forming common branch nodes VA 244 and VB 246.

Figure 23:
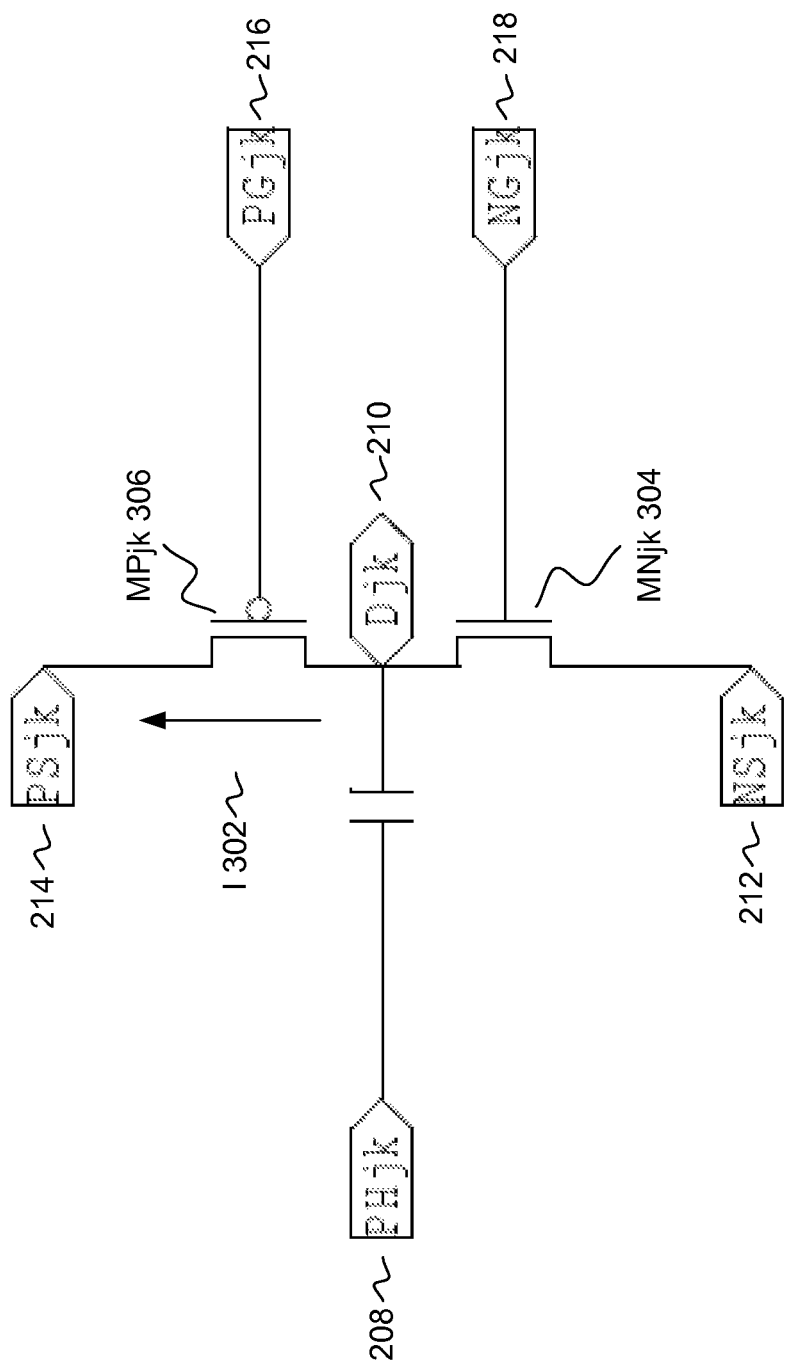
FIG. 23 illustrates a circuit diagram of a T-circuit block of the present invention during a low-to-high phase node transition.

FIG. 23 illustrates a circuit diagram of a T-circuit block of the present invention during a low-to-high phase node transition. The theory-of-operation of an individual T-circuit cell of the distributed charge pump during a low 0-volt to high voltage V transition on phase node PHjk 208 can be as follows. During the low-to-high transition on PHjk 208, charge flows through PMOS MPjk 306 such that the direction of conventional current flow I 302 circulates from node Djk 210 through the PMOS MPjk 306 channel to its source PSjk 214. The algorithm to generate the connections have been formulated so as to allow PMOS MPjk 306 to conduct current during this transition while causing NMOS MNjk 304 to block current from flowing in the other direction. During the low-to-high transition on phase node PHjk 208, the NMOS gate NGjk 218 is controlled such that no current will flow from common drain Djk 210 to the NMOS source NSjk 212. Also, during the low-to-high transition on phase-node PHjk 208, the PMOS gate PGjk 216 receives a voltage which allows conduction of current through PMOS MPjk 306. The connection algorithms are designed to allow optimum and sufficient gate drive to achieve low voltage, e.g., less than one volt input operation. Therefore, the clock signal transition can operate even when the voltage V is less than one volt.

Figure 24:
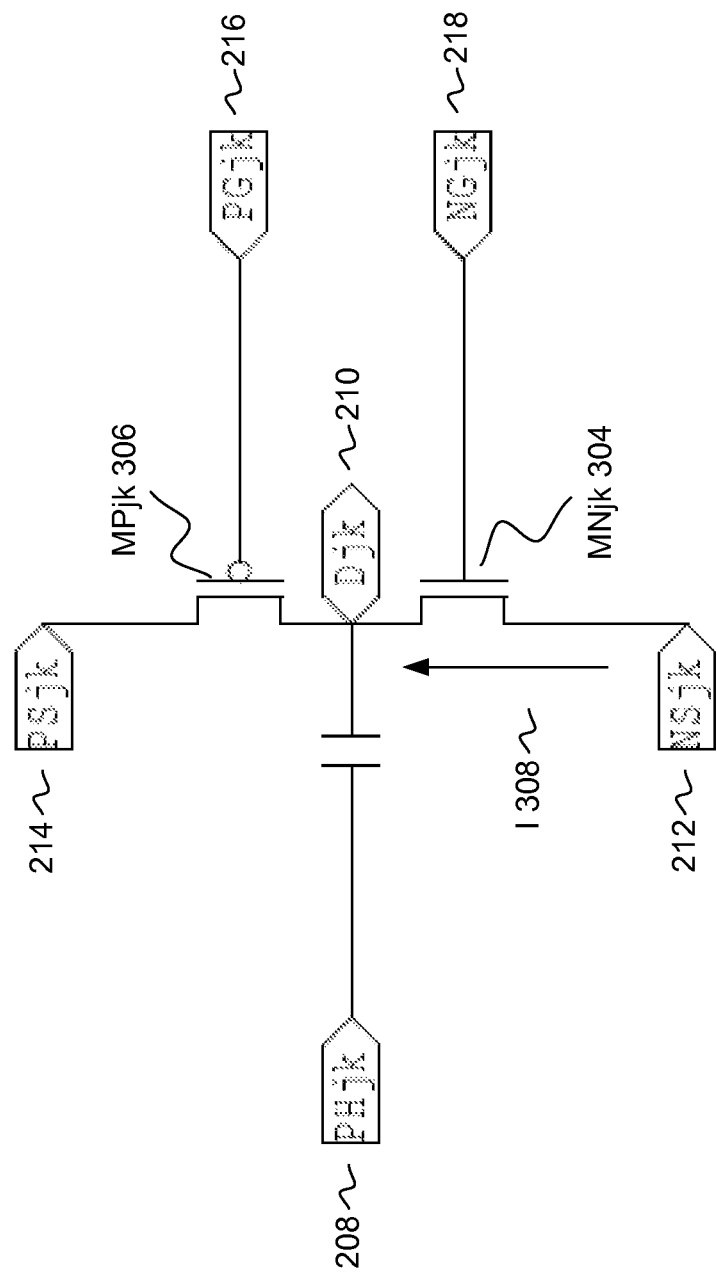
FIG. 24 illustrates a circuit diagram of a T-circuit block of the present invention during a high-to-low phase node transition.

FIG. 24 illustrates a circuit diagram of a T-circuit block of the present invention during a high-to-low phase node transition. The theory-of-operation of an individual T-circuit cell during a high voltage V to low voltage, e.g., 0-volt, transition on phase node PHjk 208 can be as follows. During the high-to-low transition on the node PHjk 208, charge flows through NMOS MNjk 304 such that the direction of conventional current flow I 308 circulates from NMOS source node NSjk 212 through the NMOS MNjk 304 channel to the common-drain node Djk 210. The algorithm to generate the connections have been formulated so as to allow NMOS MNjk 304 to conduct current during this transition while causing PMOS MPjk 306 to block current from flowing in the other direction. During the high-to-low transition on phase node PHjk 208, the PMOS gate PGjk 216 is controlled such that no current will flow from the PMOS source PSjk 214 to the common drain Djk 210. Also, during the high-to-low transition on phase-node PHjk 208, the NMOS gate NGjk 218 receives a voltage which allows conduction of current through NMOS MNjk 304. The connection algorithms are designed to allow optimum and sufficient gate drive to achieve low voltage, less-than-one-volt input operation. Therefore, the clock signal transition can operate even when the voltage V is less than one.

Figure 25:
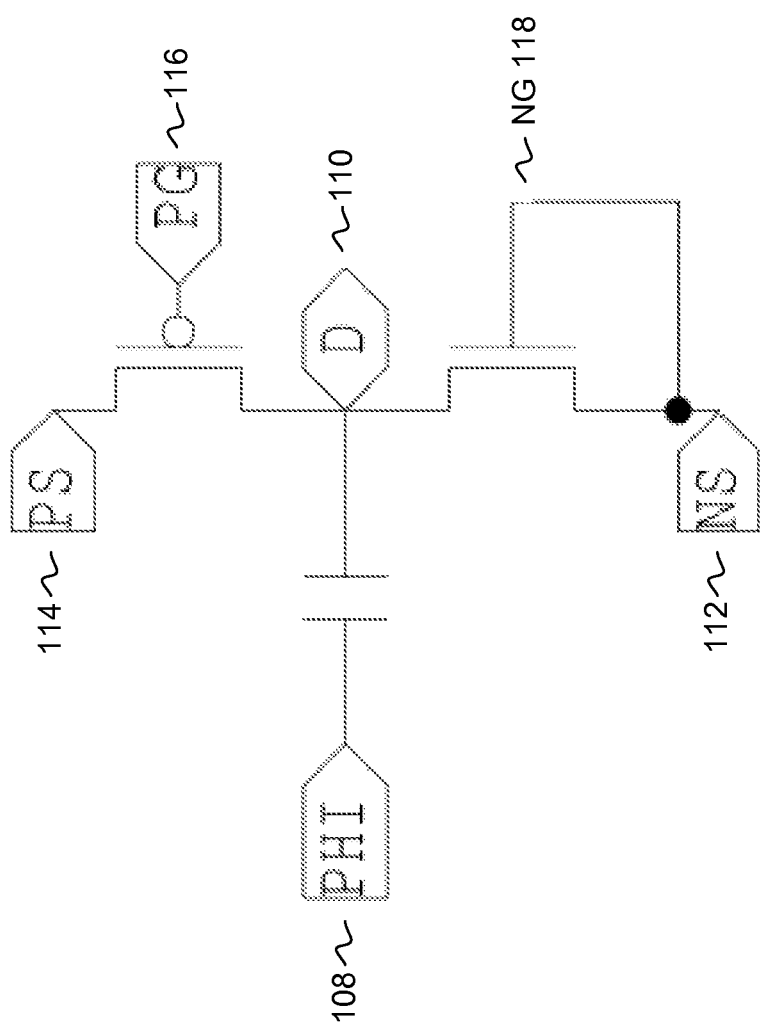
FIG. 25 illustrates a circuit diagram of a T-circuit block of the present invention having an NMOS gate connected to its source.

FIG. 25 illustrates a circuit diagram of a T-circuit block of the present invention having an NMOS gate connected to its source. Here, the NMOS gate NG 118 of the T-circuit cell is connected to the NMOS source NS 112 of the T-circuit cell.

In alternate embodiments of the present invention, when the T-circuit cell is within an array of T-circuit cells, the NMOS gate NG 118 of the T-circuit cell can be connected to a common drain of a select one of the T-circuit cells in the same branch, where the select one of the T-circuit cells is on a higher level of the array.

Figure 26:
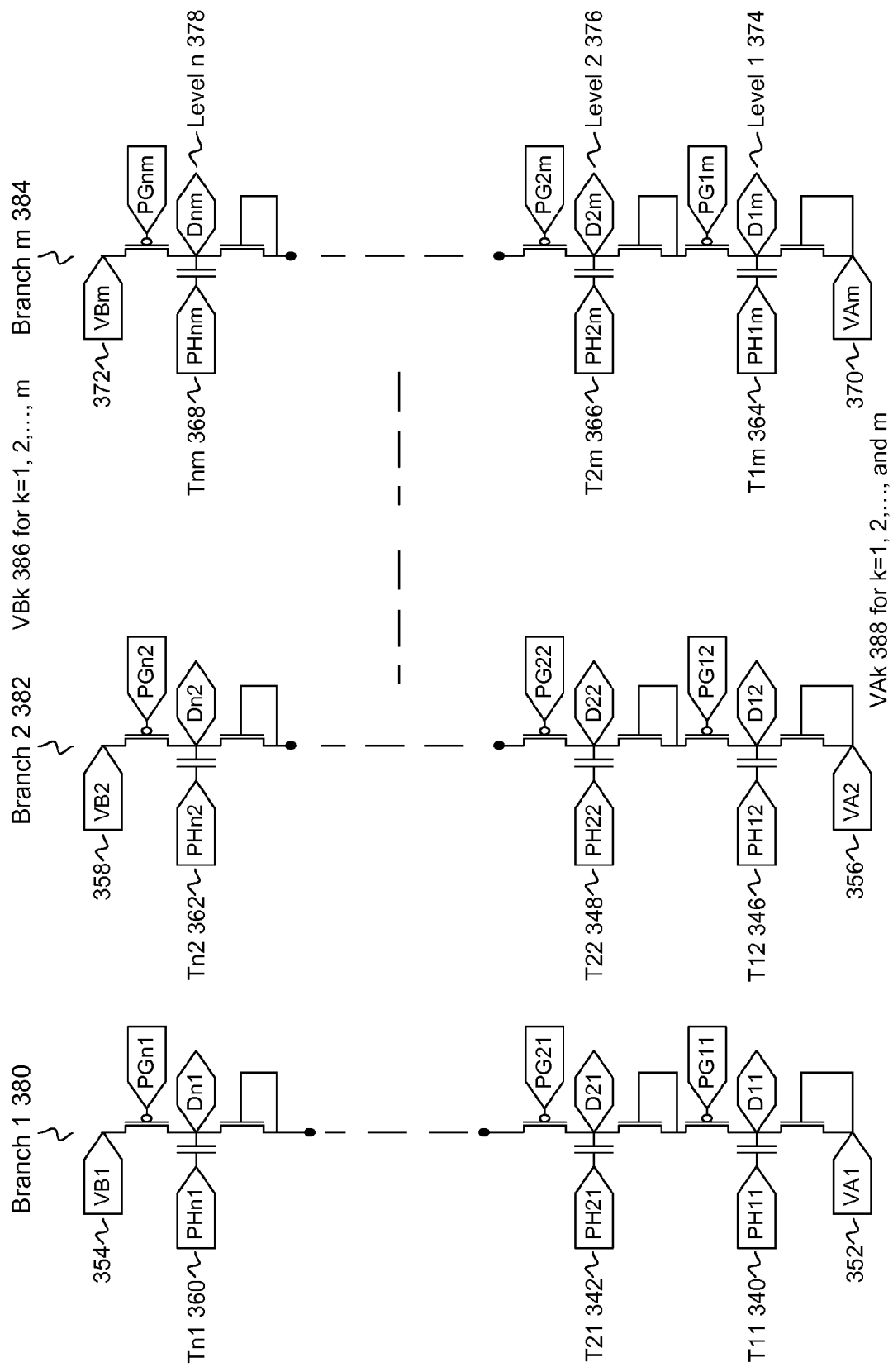
FIG. 26 illustrates a circuit diagram of another generalized array of the present invention having m circuit branches, where each branch is comprised of n T-circuit blocks.

FIG. 26 illustrates a circuit diagram of another generalized array of the present invention having m circuit branches, where each branch is comprised of n T-circuit blocks. A distributed charge-pump array of the present invention forms a matrix of T-circuit cells connected in series to form n levels and m branches. The T-circuit cells of the distributed charge-pump array can be implemented by T-circuit cells, as illustrated in FIG. 25. The position of each T-circuit cell and each node is again represented by a label. The n levels are level 1 374, level 2 376, and through to level n 378. The m branches are branch 1 380, branch 2 382, and through to branch m 384.

The first branch, branch 1 380, comprises series connected T-circuit cells T11 340, T21 342, and through to Tn1 360. The second branch, branch 2 382, comprises series connected T-circuit cells T12 346, T22 348, and through to Tn2 362. The mth-branch, branch m 384, comprises series connected T-circuit cells T1m 364, T2m 366, and through to Tnm 368. The NMOS sources of the T-circuit cells the level 1 374 are assigned the labels VA1 352, VA2 356, through VAm 370 with a label index VAk 388 where k=1, 2, . . . , and m. Similarly the endpoint branch nodes formed by the PMOS sources of the T-circuit cells for level n 378 are assigned the labels VB1 354, VB2 358, and through to VBm 372 with a label index VBk 386 where k=1, 2, . . . , and m.

Figure 27:
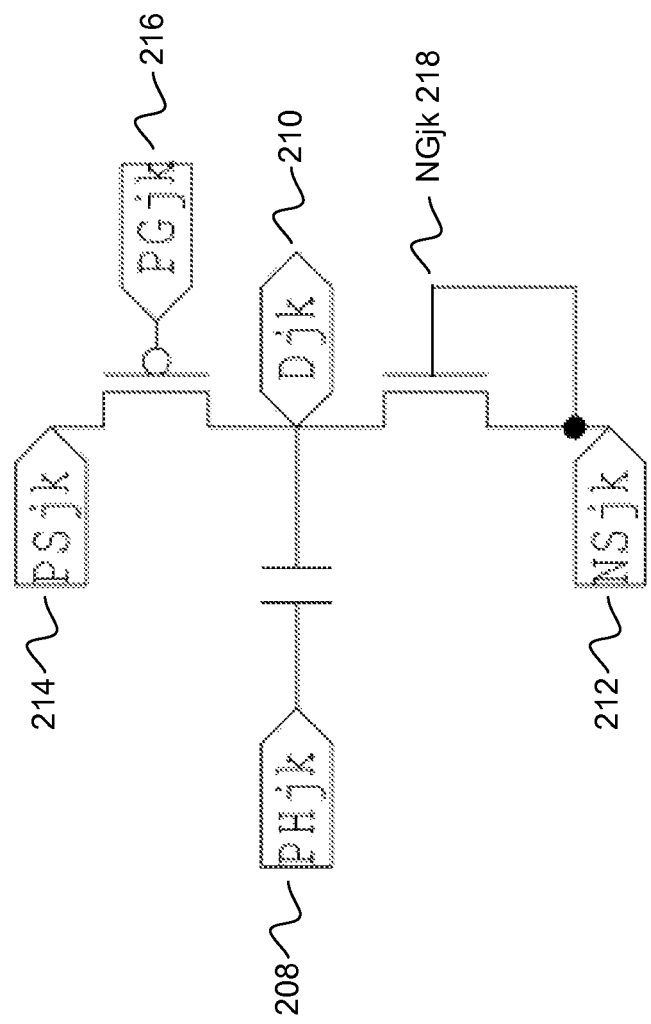
FIG. 27 illustrates a circuit diagram of a distributed-array of a single T-circuit block of the present invention.

FIG. 27 illustrates a circuit diagram of a distributed-array of a single T-circuit block of the present invention. A matrix convention can be used to label the nodes of an arbitrary T-circuit cell, as illustrated in FIG. 25, for use in a distributed charge-pump network of the present invention. Using an index j 220 to represent the n levels and an index k 222 to represent the m branches, each node can be assigned a matrix position jk. For instance, the phase voltage can be identified and referenced as PHjk 208; the common drain voltage can be identified and referenced as Djk 210; the NMOS source can be identified and referenced as NSjk 212; the PMOS source can be identified and referenced as PSjk 214; and the PMOS gate can be identified and referenced as PGjk 216. The NMOS gate NGjk 218 is connected to its source NSjk 212.

The algorithms for connecting the T-circuit cells of FIG. 20 can also apply to the T-circuit cells illustrated in FIG. 27, except for one simplification that the algorithm for connecting NGjk 218 no longer applies because each NMOS gate NGjk 218 is already connected to its source NSjk 212.

Figure 28:
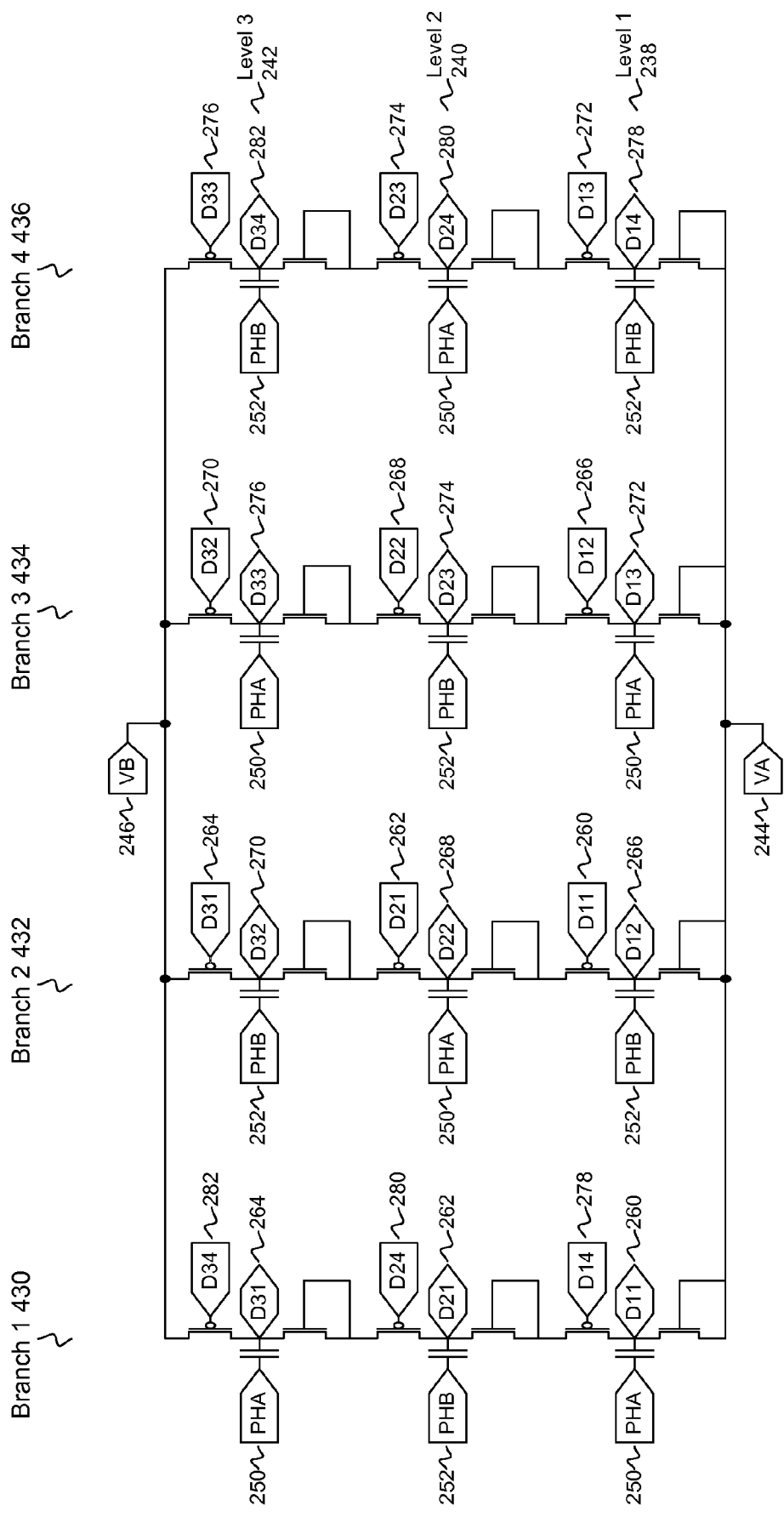
FIG. 28 illustrates a circuit diagram of another distributed three-level, four-branch, charge-pump array of the present invention.

FIG. 28 illustrates a circuit diagram of another distributed three-level, four-branch, charge-pump array of the present invention. A four-branch, three-level distributed charge pump of the present invention can use the above matrix node-connection algorithms for interconnecting the T-circuit cells. The four-branch, three-level distributed charge pump comprises branch 1 430, branch 2 432, branch 3 434, and branch 4 436, where the branches are connected together at branch endpoint nodes VA 244 and VB 246. According to the algorithm constraints, the following is asserted VAk=VA and VBk=VB for all k. There are three levels in each of the branches 1 430, 2 432, 3 434, and 4 436, including level 1 238, level 2 240, and level 3 242. The phase nodes PHjk 208 have been connected according to PHjk=PHA 250 when j+k is even and according to PHjk=PHB 252 when j+k is odd. The construction and connections are similar to that of FIG. 21, except now each NMOS gate of the T-circuit cells connect to its respective source.

Figure 29:
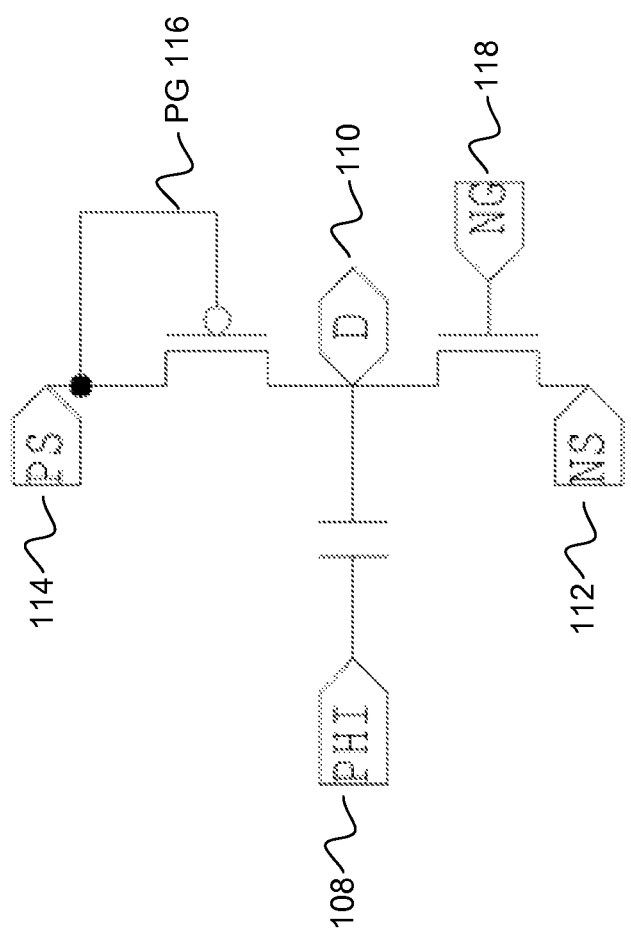
FIG. 29 illustrates a circuit diagram of a T-circuit block of the present invention, where the PMOS gate of the T-circuit block is connected to its source.

FIG. 29 illustrates a circuit diagram of a T-circuit block of the present invention, where the PMOS gate of the T-circuit block is connected to its source. Here, the PMOS gate PG 116 of the T-circuit cell is connected to the PMOS source PS 114 of the T-circuit cell.

In alternate embodiments of the present invention, when the T-circuit cell is within an array of T-circuit cells, the PMOS gate PG 116 of the T-circuit cell can be connected to a common drain of a select one of the T-circuit cells in the same branch, where the select one of the T-circuit cells is on a higher level of the array.

Figure 30:
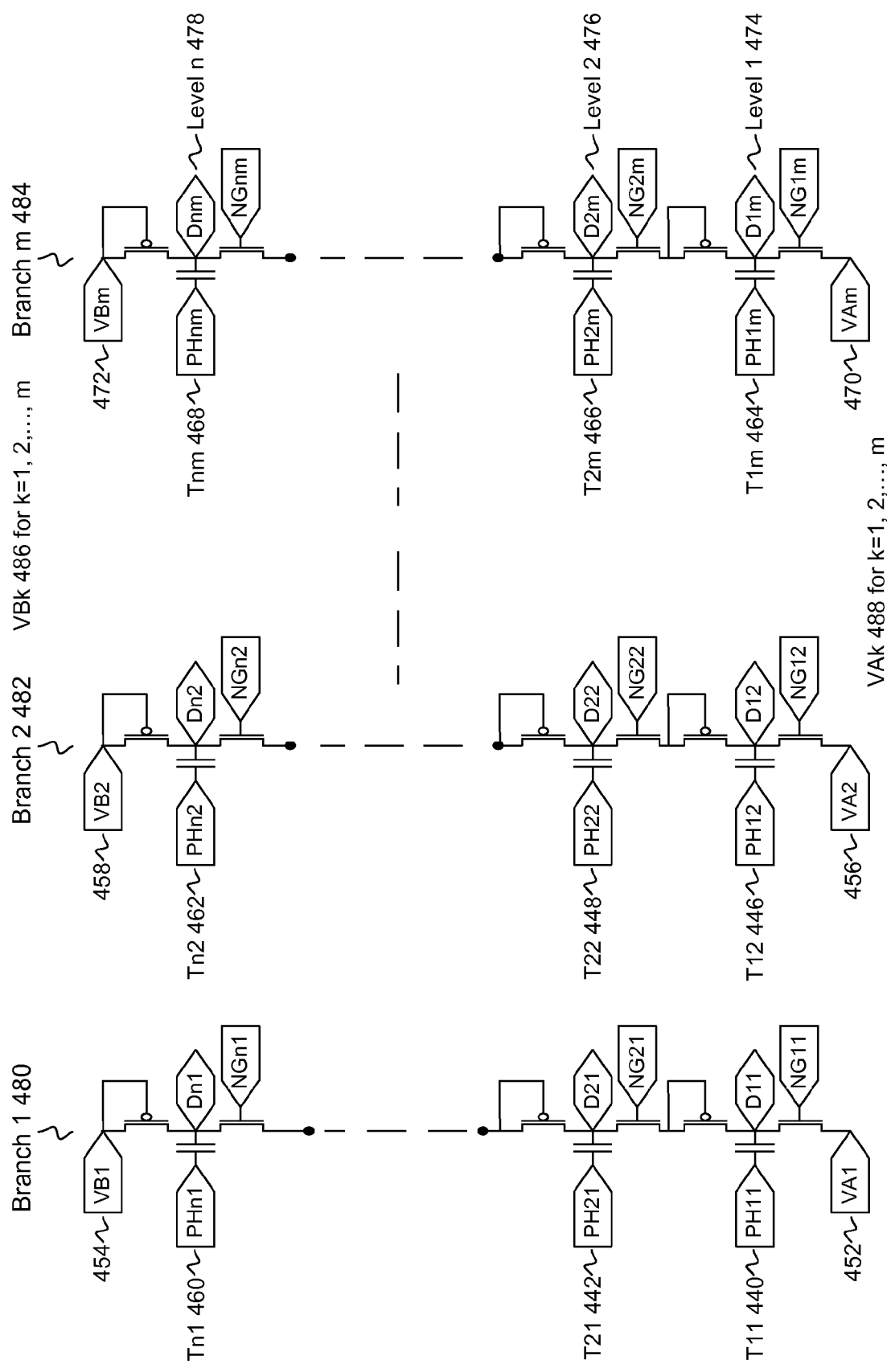
FIG. 30 illustrates a circuit diagram of yet another generalized array of the present invention having m circuit branches, where each branch is comprised of n T-circuit blocks.

FIG. 30 illustrates a circuit diagram of yet another generalized array of the present invention having m circuit branches, where each branch is comprised of n T-circuit blocks. A distributed charge-pump array of the present invention can comprise a matrix of T-circuit cells connected in series to form n levels and m branches, where the T-circuit cells are of the type illustrated in FIG. 29. The position of each of the T-circuit cells and each node is again represented by a labeling convention as previously discussed. The n levels are level 1 474, level 2 476, and through to level n 478. The m branches are branch 1 480, branch 2 482, and through to branch m 484.

The first branch, branch 1 480, comprises series connected T-circuit cells T11 440, T21 442, and through to T-circuit cell Tn1 460. The second branch, branch 2 482, comprises series connected T-circuit cells T12 446, T22 448, and through to T-circuit cell Tn2 462. The mth-branch, branch m 484, comprises series connected T-circuit cells T1m 464, T2m 466, and through to T-circuit cell Tnm 468. The NMOS sources of the level 1 474 T-circuit cells are assigned the labels VA1 452, VA2 456, and through to VAm 470 with a label index VAk 488 where k=1, 2, . . . , and m. Similarly, the endpoint branch nodes formed by the PMOS sources of the level n 478 T-circuit cells are assigned the labels VB1 454, VB2 458, and through to VBm 472 with a label index VBk 486 where k=1, 2, . . . , and m.

Figure 31:
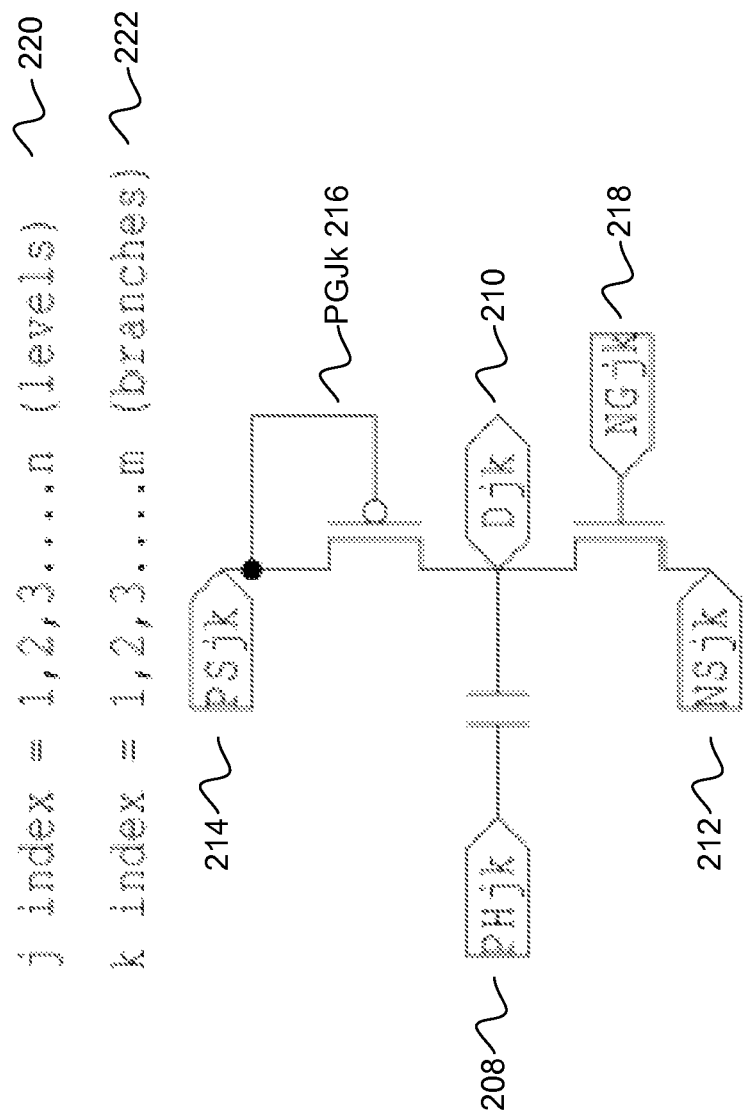
FIG. 31 illustrates a circuit diagram of yet another distributed-array of the present invention having a single T-circuit block, where the PMOS gate of the T-circuit block is connected to its source.

FIG. 31 illustrates a circuit diagram of yet another distributed-array of the present invention having a single T-circuit block, where the PMOS gate of the T-circuit block is connected to its source. A matrix convention for labeling the nodes of an arbitrary T-circuit cell as previously discussed can be used for this type of T-circuit cell. Using an index j 220 to represent the n levels and an index k 222 to represent the m branches, each node is assigned a matrix position jk. For instance, the phase voltage for the T-circuit cell is identified and referenced as PHjk 208; the common drain voltage for the T-circuit cell is identified and referenced as Djk 210; the NMOS source for the T-circuit cell is identified and referenced as NSjk 212; the PMOS source for the T-circuit cell is identified and referenced as PSjk 214; and the NMOS gate for the T-circuit cell is identified and referenced as NGjk 218. The PMOS gate PGjk 216 is connected to its source PSjk 214.

The algorithms for connecting the T-circuit cells illustrated in FIG. 20 also apply to the T-circuit cells illustrated in FIG. 31, except for one simplification that the algorithm for connecting PGjk 216 no longer applies because each PMOS gate PGjk 216 is already connected to its source PSjk 214.

Figure 32:
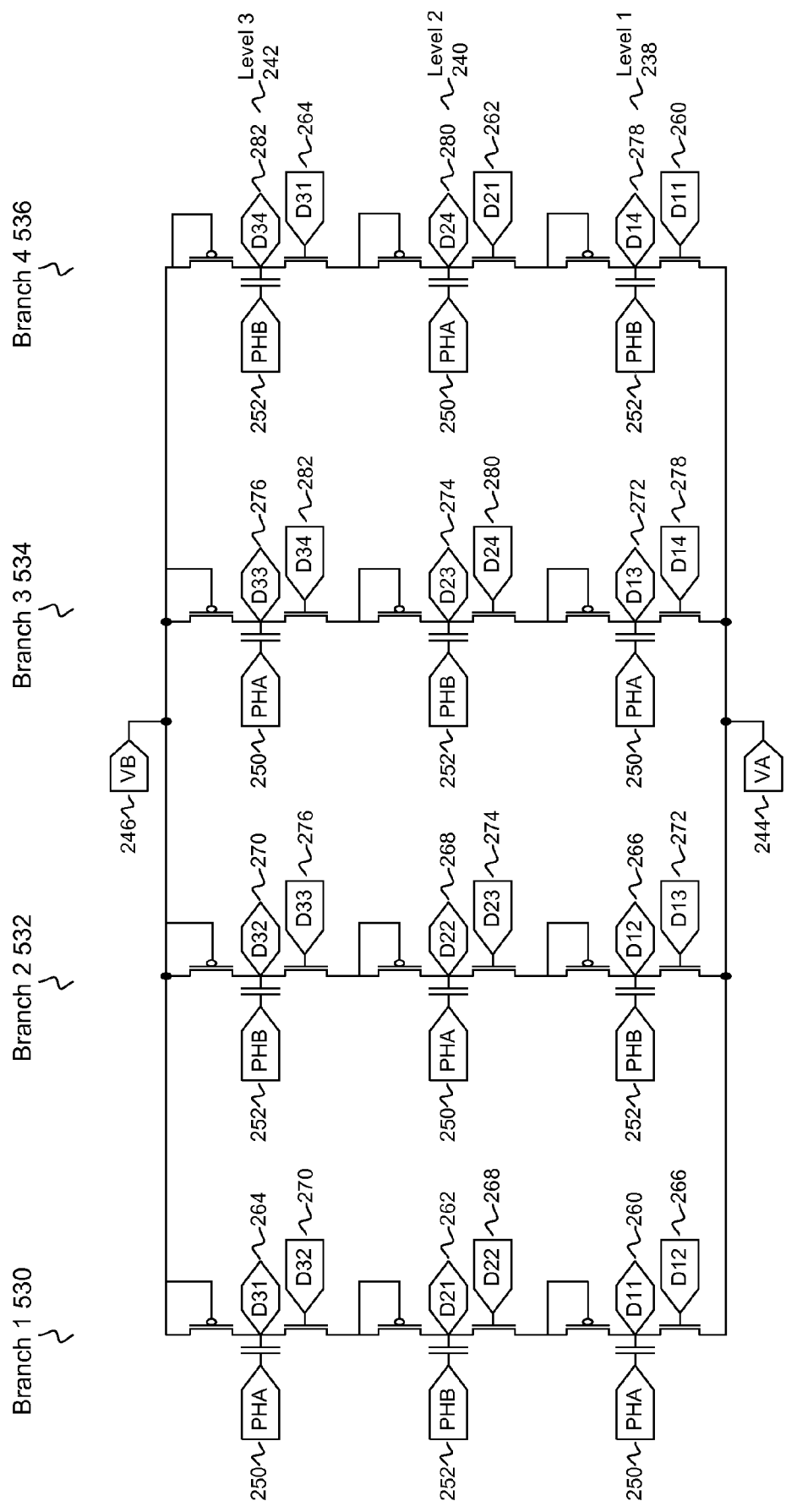
FIG. 32 illustrates a circuit diagram of yet another distributed three-level, four-branch, charge-pump array of the present invention.

FIG. 32 illustrates a circuit diagram of yet another distributed three-level, four-branch, charge-pump array of the present invention. A four-branch, three-level distributed charge pump can use the above described matrix node-connection algorithms. The four-branch, three-level distributed charge pump of the present invention comprises four branches, including branch 1 530, branch 2 532, branch 3 534, and branch 4 536, which are connected together at branch endpoint nodes VA 244 and VB 246 according to the algorithm constraints VAk=VA and VBk=VB for all k. There are three levels for each of the T-circuit cell branches, including level 1 238, level 2 240, and level 3 242. The phase nodes PHjk 208 have been connected according to PHjk=PHA 250 when j+k is even and according to PHjk=PHB 252 when j+k is odd. The construction and connections are equivalent to that illustrated in FIG. 21 except now each PMOS gate connects to its source.

Figure 33:
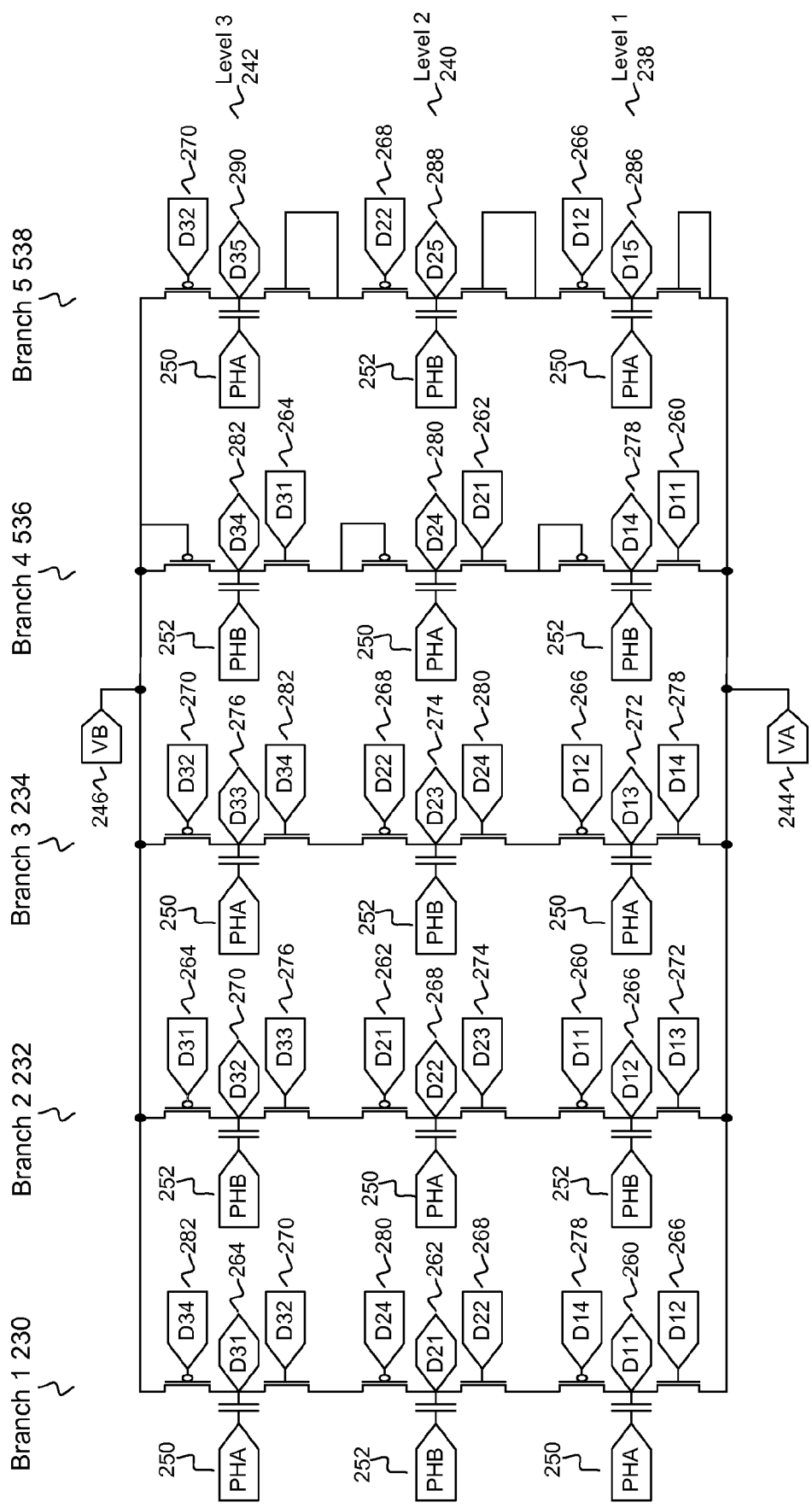
FIG. 33 illustrates a circuit diagram of yet another distributed three-level, five-branch, charge-pump array of the present invention.

FIG. 33 illustrates a circuit diagram of yet another distributed three-level, five-branch, charge-pump array of the present invention. A five-branch, three-level distributed charge pump of the present invention can use a combination of T-circuit cells, as illustrated in FIG. 20, FIG. 25, and FIG. 29. For instance, the first three branches, branch 1 230, branch 2 232, and branch 3 234, can be constructed using T-circuit cells illustrated in FIG. 20 and with the algorithms consistent with those described in relation to the T-circuit cells illustrated in FIG. 20. The fifth branch, branch 5 538 can be constructed from T-circuit cells illustrated in FIG. 25 and with the algorithms consistent with those described in relation to the T-circuit cells illustrated in FIG. 25. The fourth branch, branch 4 536 can be constructed from T-circuit cells illustrated in FIG. 29 and with algorithms consistent with those described in relation to the T-circuit cells illustrated in FIG. 29.

Figure 34:
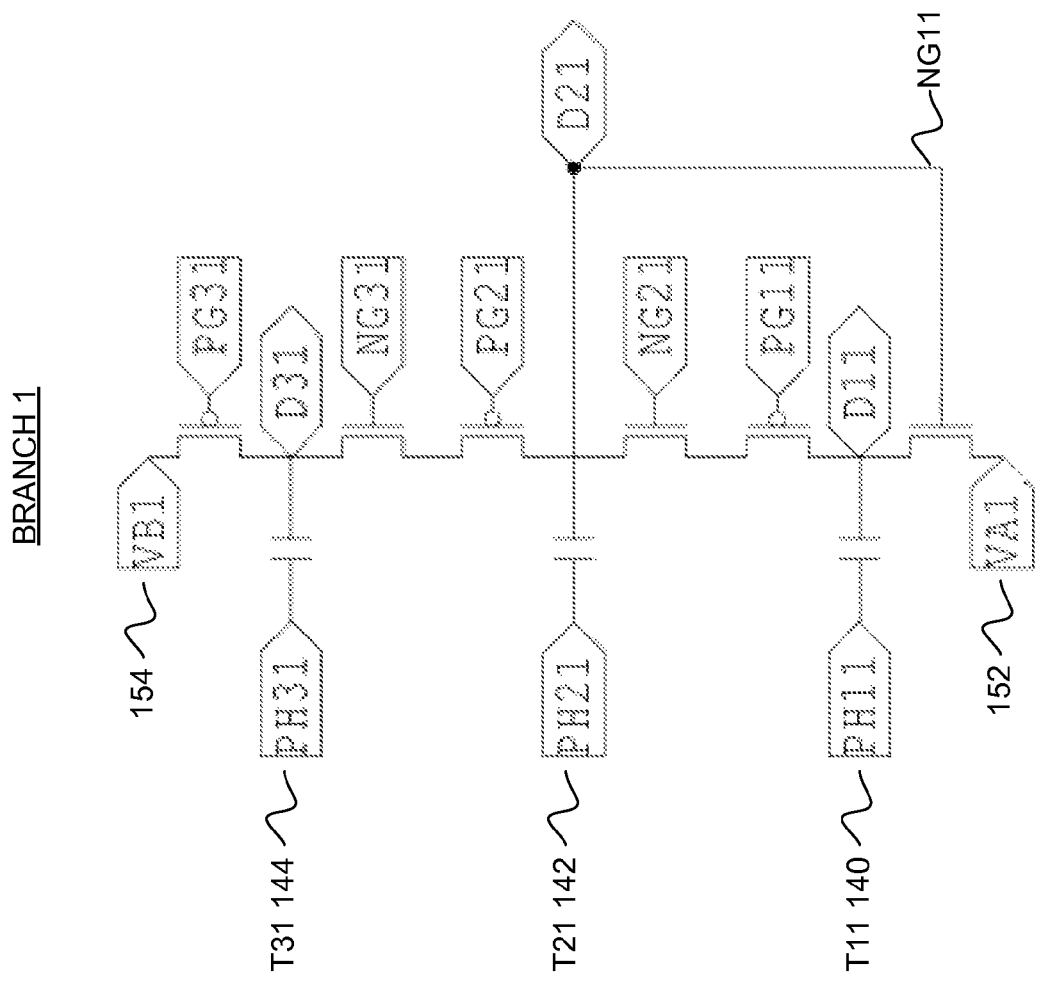
FIG. 34 illustrates a circuit diagram of a branch of the present invention to show a methodology for intra-branch connections of T-circuit nodes.

FIG. 34 illustrates a circuit diagram of a branch of the present invention to show a methodology for intra-branch connections of T-circuit nodes. In another intra-branch embodiment or algorithm for connecting an NMOS gate of a T-circuit cell, the NMOS gate is connected to the next-level common-drain node. For instance, the first level T-circuit cell T11 140's NMOS gate NG11 is connected to the next level T-circuit T21 142's common-drain node D21.

Figure 35:
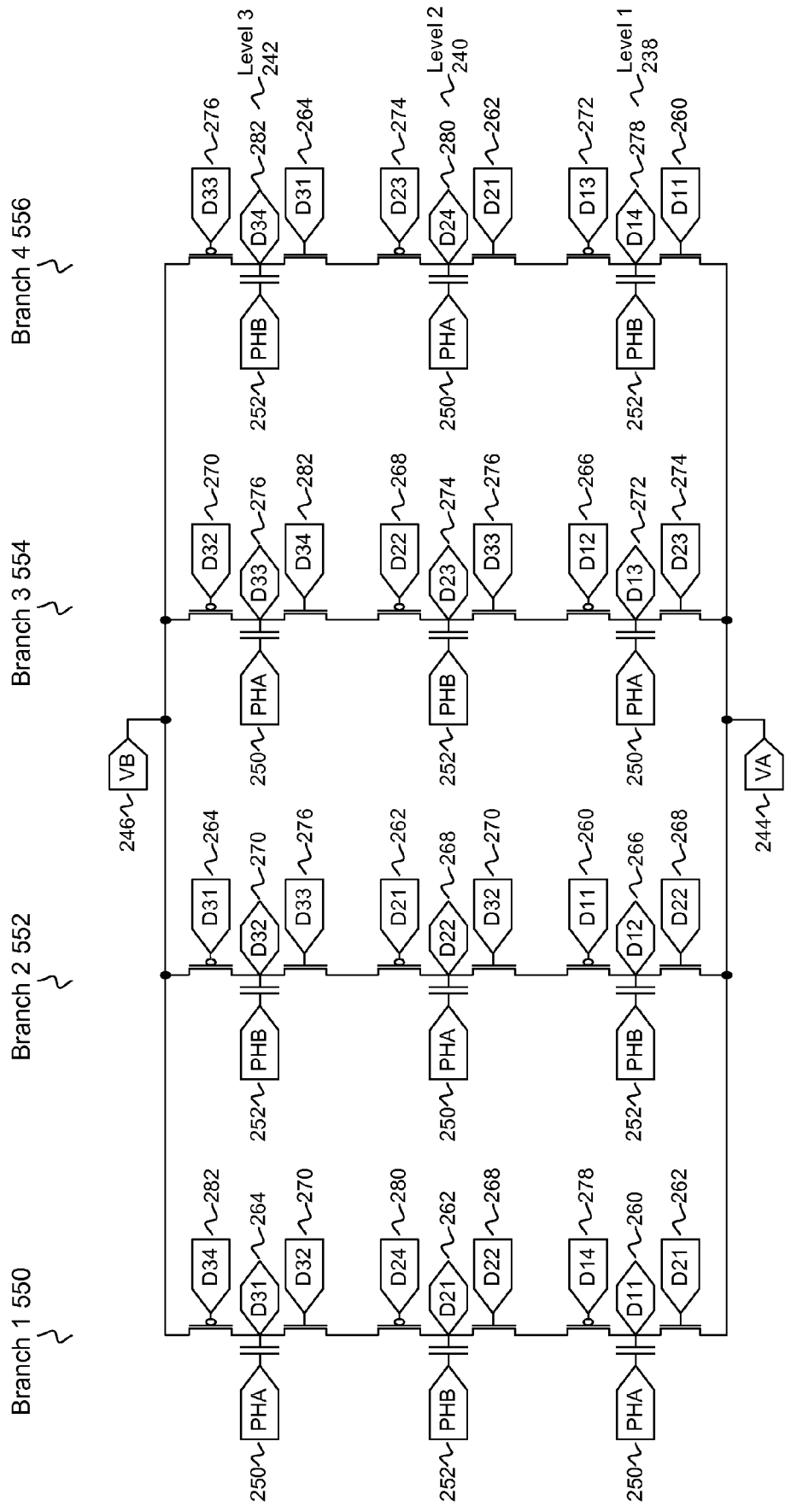
FIG. 35 illustrates a circuit diagram of yet another distributed three-level, four-branch, charge-pump array of the present invention having intra-branch connections.

FIG. 35 illustrates a circuit diagram of yet another distributed three-level, four-branch, charge-pump array of the present invention having intra-branch connections. A four-branch 550, 552, 554, and 556, three-level 238, 240, and 242 distributed charge pump of the present invention can be implemented using T-circuit cells of the type illustrated in FIG. 34. The construction and connections can be equivalent to that illustrated in FIG. 21, except now the NMOS gates of level 1 238 and level 2 240 follow the algorithm illustrated in FIG. 34 for intra-branch connections.

Figure 36:
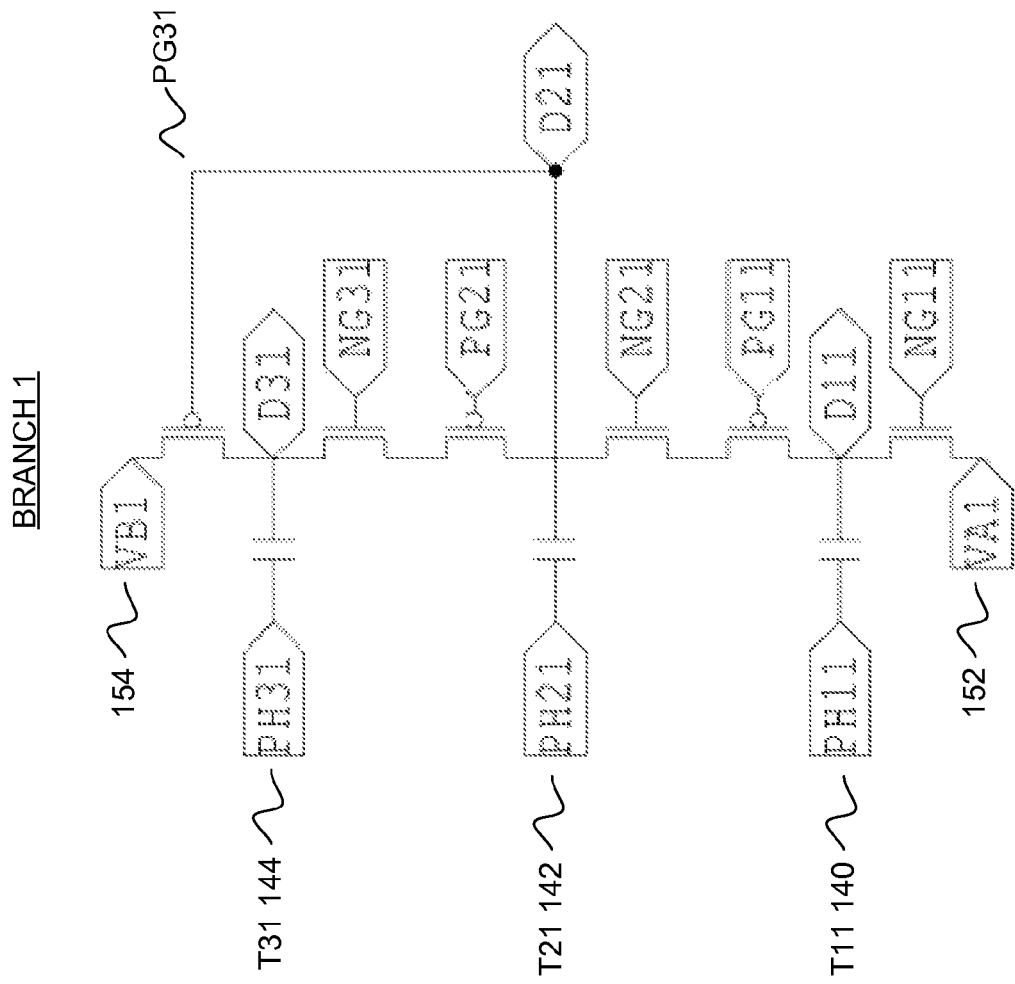
FIG. 36 illustrates a circuit diagram of yet another branch of the present invention to show a methodology for intra-branch connections of T-circuit nodes.

FIG. 36 illustrates a circuit diagram of yet another branch of the present invention to show a methodology for intra-branch connections of T-circuit nodes. In yet another intra-branch embodiment or algorithm for connecting a PMOS gate of a T-circuit cell, the PMOS gate of the T-circuit cell is connected to its adjacent-level common-drain node. By way of example, the third level T-circuit cell T31 144's PMOS gate PG31 is connected to the lower level T-circuit T21 142's common-drain node D21.

Figure 37:
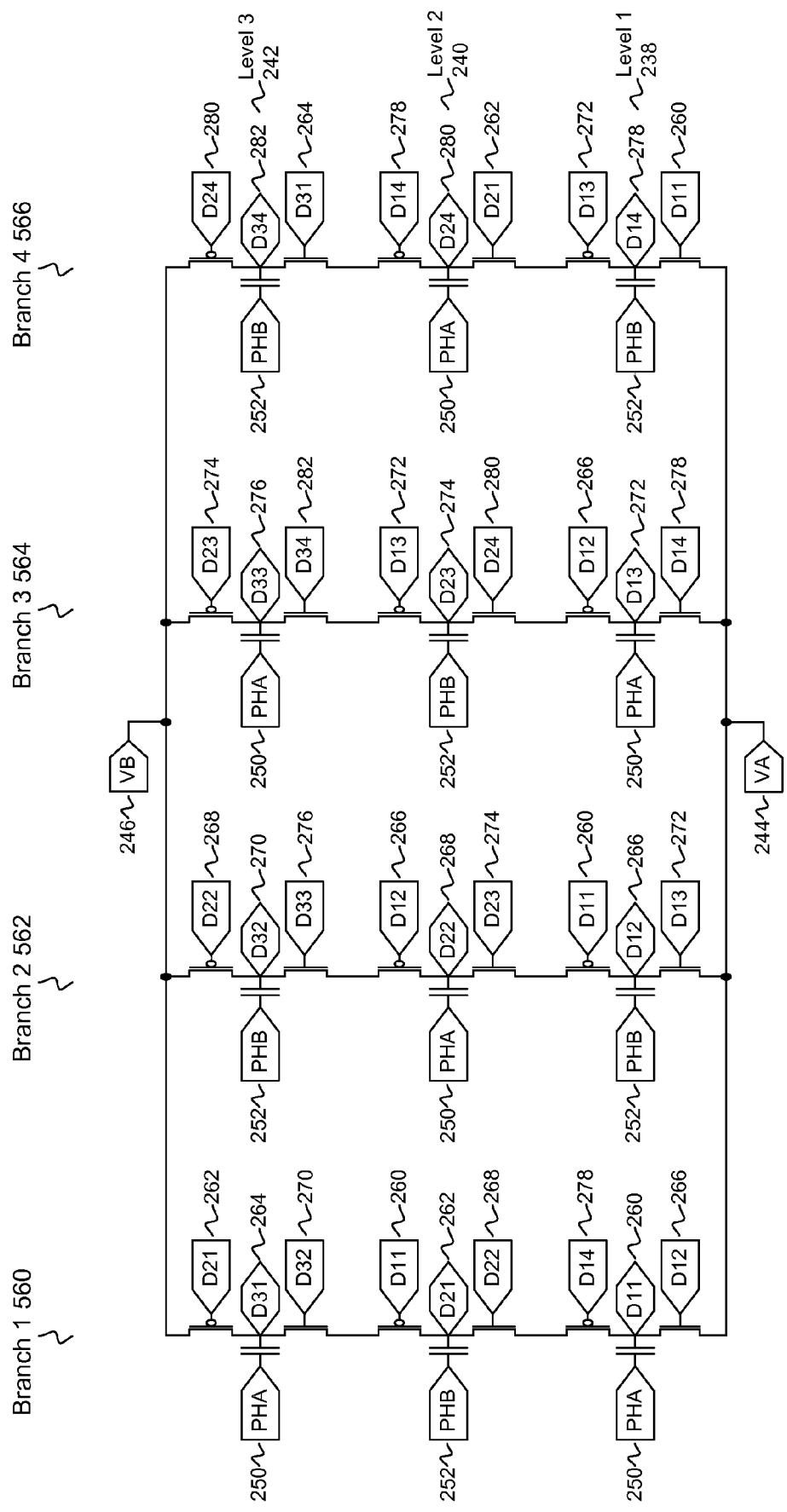
FIG. 37 illustrates another distributed three-level, four-branch charge-pump array of the present invention having intra-branch connections.

FIG. 37 illustrates another distributed three-level, four-branch charge-pump array of the present invention having intra-branch connections. A four-branch 560, 562, 564, and 566, three-level 238, 240, and 242 distributed charge pump of the present invention can be implemented using T-circuit cells of the type illustrated in FIG. 36. The construction and connections of the charge pump can be similar to the one illustrated in FIG. 21, except that now the PMOS gates of level 2 240 and level 3 242 follow the algorithm illustrated in FIG. 36 for intra-branch connections.

With respect to the design and operation of charge pumps using the distributed charge-pump arrays of the present invention, one possible design menu or embodiment for creating a charge pump array to operate at voltages for less than one volt can be as follows:

1. A T-circuit configuration (e.g., such as FIG. 20) is selected and the size of the switches and charge pump capacitors is estimated to allow charge pump operation at a specified output current load.

2. Also, at least three branches and the minimum number of levels are selected to meet the design output voltage, either negative or positive.

3. The charge pump array is simulated using a specified loading condition.

4. A convenient variable among the number of branches, number of stages, pump capacitance, clock frequency and switch size are chosen.

This approach can be iterative and have several possible design variables, including the number of branches. The overall design procedure will also depend upon design constraints such as circuit area, operating switching current, and/or other considerations. By sacrificing circuit area and allowing an increase in the number of branches and overall pump capacitance, the frequency may be reduced to meet a loading condition. Also, the technique and algorithms for generating distributed charge pumps offers an additional design variable for optimizing a given charge pump for a given application.

Figure 38:
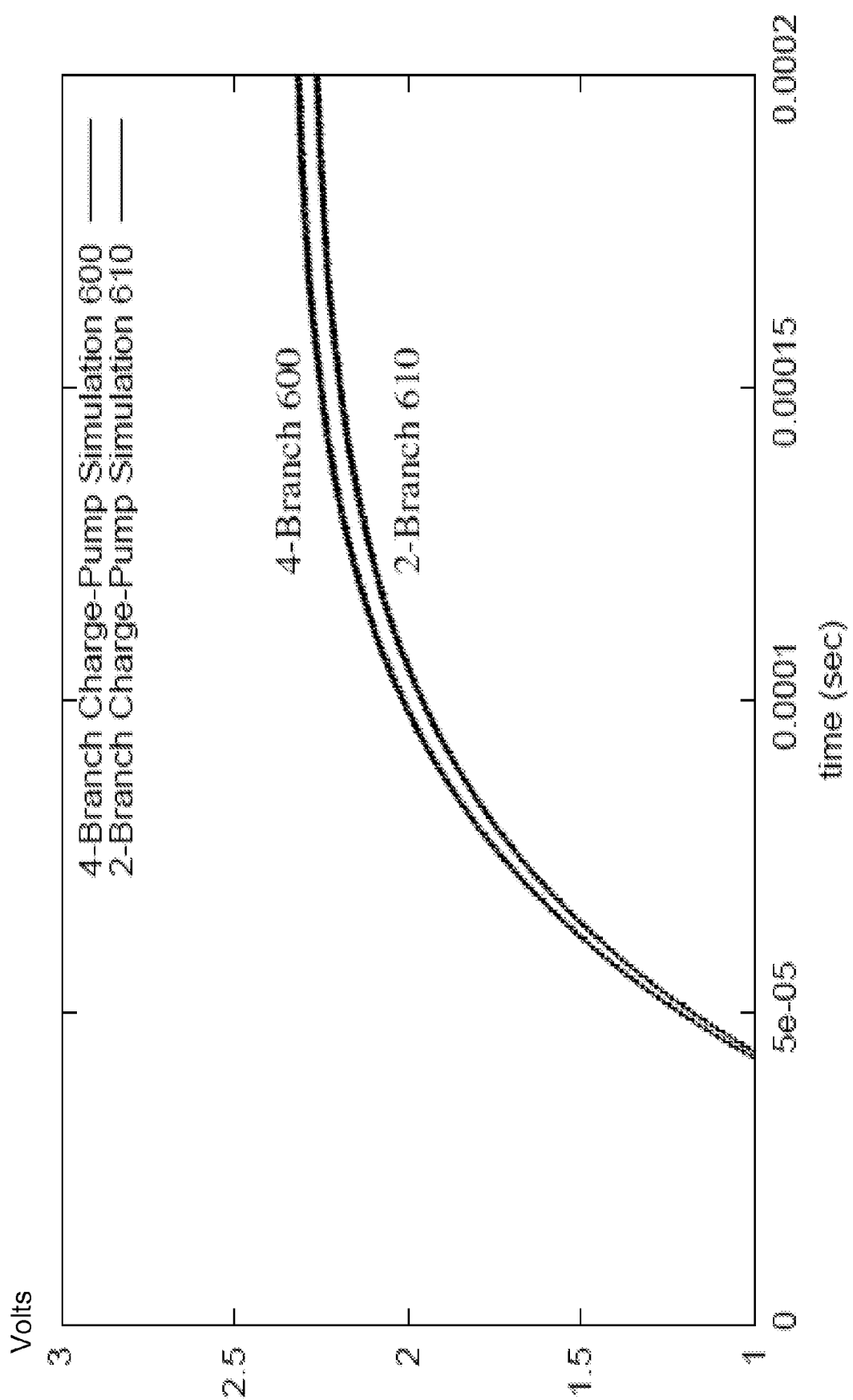
FIG. 38 illustrates a graph that shows the results of comparing the charge pump voltages of a two-branch distributed charge pump array of the present invention and a four-branch distributed charge pump array of the present invention.

FIG. 38 illustrates a graph that shows the results of comparing the charge pump voltages of a two-branch distributed charge pump array of the present invention and a four-branch distributed charge pump array of the present invention. Assuming for this example a fixed NMOS and PMOS size, a four-branch approach achieves an unexpectedly higher charge pump output 600 than a two-branch prior art approach 610 when the total pump capacitance is fixed. This means the individual T-circuit pump capacitors in the distributed four-branch approach were one-half the value of the T-circuit pump capacitors in the two-branch cells.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

I claim:

1. A charge pump comprising,
a plurality of branches each having serially-connected T-circuit cells,
wherein each of the branches has a first end for receiving an input voltage and a second end for outputting a charge pump voltage,
wherein each of the T-circuit cells comprises a first transistor, a second transistor, and a capacitor,
wherein the first transistor and the second transistor of each of the T-circuit cells have a common drain,
wherein the gate of the first transistor of a certain one of the T-circuit cells of a certain branch is connected to a first branch and the gate of the second transistor of the certain one of the T-circuit cells of the certain branch is connected to a second branch,
wherein the T-circuit cells form an array having m number of branches and n number of levels,
wherein the array has a j-index to represent a level position for the T-circuit cells and a k-index to represent a branch position for the T-circuit cells,
wherein a first end of the capacitor of the certain one of the T-circuit cells is connected to the common drain of the certain one of the T-circuit cells,
wherein a second end of the capacitor of the certain one of the T-circuit cells is connected to a signal, and
wherein the phase of the signal is a function of the j-index and the k-index of the certain one of the T-circuit cells.

2. The charge pump of claim 1 wherein the certain branch is a third branch.

3. The charge pump of claim 1 wherein the gate of the first transistor of the certain one of the T-circuit cells is connected to the common drain of a select one of the T-circuit cells, and wherein the select one of the T-circuit cells is selected as a function of a k-index of the select one of the T-circuit cells and the k-index of the certain one of the T-circuit cells.

4. The charge pump of claim 3 wherein the select one of the T-circuit cells is disposed in the same level of the array as the certain one of the T-circuit cells.

5. The charge pump of claim 1 wherein the first ends of the branches are connected together for receiving the input voltage and wherein the second ends of the branches are connected together for outputting the output voltage.

6. The charge pump of claim 1 wherein the gate of the first transistor of the certain one of the T-circuit cells is connected to the source of the first transistor of the certain one of the T-circuit cells.

7. The charge pump of claim 1 wherein the gate of the first transistor of the certain one of the T-circuit cells is connected to a common drain of a select one of the T-circuit cells in the same branch.

8. A charge pump comprising,
a plurality of branches each having serially-connected T-circuit cells,
wherein each of the branches has a first end for receiving an input voltage and a second end for outputting a charge pump voltage,
wherein each of the T-circuit cells comprises a first transistor, a second transistor, and a capacitor,
wherein the first transistor and the second transistor of each of the T-circuit cells have a common drain,
wherein the gate of the first transistor of a certain one of the T-circuit cells of a certain branch is connected to a first branch and the gate of the second transistor of the certain one of the T-circuit cells of the certain branch is connected to a second branch,
wherein the certain branch is a third branch,
wherein the T-circuit cells of the first branch each have the gate of the first transistor connected to the source of the first transistor,
wherein the T-circuit cells form an array having m number of branches and n number of levels,
wherein the array has a j-index to represent a level position for the T-circuit cells and a k-index to represent a branch position for the T-circuit cells,
wherein a first end of the capacitor of the certain one of the T-circuit cells is connected to the common drain of the certain one of the T-circuit cells,
wherein a second end of the capacitor of the certain one of the T-circuit cells is connected to a signal, and
wherein the phase of the signal is a function of the j-index and the k-index of the certain one of the T-circuit cells.

9. The charge pump of claim 8 wherein the gate of the first transistor of the certain one of the T-circuit cells is connected to the common drain of a select one of the T-circuit cells, and wherein the select one of the T-circuit cells is selected as a function of a k-index of the select one of the T-circuit cells and the k-index of the certain one of the T-circuit cells.

10. The charge pump of claim 9 wherein the select one of the T-circuit cells is disposed in the same level of the array as the certain one of the T-circuit cells.

11. The charge pump of claim 8 wherein the first ends of the branches are connected together for receiving the input voltage and wherein the second ends of the branches are connected together for outputting the output voltage.

12. The charge pump of claim 8 wherein the gate of the first transistor of the certain one of the T-circuit cells is connected to a common drain of a select one of the T-circuit cells in the same branch.

13. A charge pump comprising,
a plurality of branches each having serially-connected T-circuit cells,
wherein each of the branches has a first end for receiving an input voltage and a second end for outputting a charge pump voltage,
wherein the first ends of the branches are connected together for receiving the input voltage,
wherein the second ends of the branches are connected together for outputting the output voltage,
wherein the T-circuit cells form an array having m number of branches and n number of levels,
wherein the array has a j-index to represent a level position for the T-circuit cells and a k-index to represent a branch position for the T-circuit cells,
wherein each of the T-circuit cells comprises a first transistor, a second transistor, and a capacitor,
wherein the first transistor and the second transistor of each of the T-circuit cells have a common drain,
wherein the gate of the first transistor of a certain one of the T-circuit cells of a certain branch is connected to a first branch and the gate of the second transistor of the certain one of the T-circuit cells of the certain branch is connected to a second branch,
wherein the certain branch is a third branch,
wherein a first end of the capacitor of the certain one of the T-circuit cells is connected to the common drain of the certain one of the T-circuit cells,
wherein a second end of the capacitor of the certain one of the T-circuit cells is connected to a signal, wherein the phase of the signal is a function of the j-index and the k-index of the certain one of the T-circuit cells, wherein the gate of the first transistor of the certain one of the T-circuit cells is connected to the common drain of a select one of the T-circuit cells, wherein the select one of the T-circuit cells is selected as a function of a k-index of the select one of the T-circuit cells and the k-index of the certain one of the T-circuit cells, and wherein the select one of the T-circuit cells is disposed in the same level of the array as the certain one of the T-circuit cells.

14. The charge pump of claim 13 wherein the gate of the first transistor of the certain one of the T-circuit cells is connected to the source of the first transistor of the certain one of the T-circuit cells.

15. The charge pump of claim 13 wherein the gate of the first transistor of the certain one of the T-circuit cells is connected to a common drain of a select one of the T-circuit cells in the same branch.

* * * * *